US011184685B2

(12) United States Patent
Strickland

(10) Patent No.: US 11,184,685 B2
(45) Date of Patent: Nov. 23, 2021

(54) SOCIALLY ANNOTATED AUDIOVISUAL CONTENT

(71) Applicant: SCENER INC., Seattle, WA (US)

(72) Inventor: Daniel Strickland, Seattle, WA (US)

(73) Assignee: SCENER INC., Seattle, WA (US)

( * ) Notice: Subject to any disclaimer, the term of this patent is extended or adjusted under 35 U.S.C. 154(b) by 0 days.

(21) Appl. No.: 17/043,585

(22) PCT Filed: Mar. 29, 2019

(86) PCT No.: PCT/US2019/025037
§ 371 (c)(1),
(2) Date: Sep. 29, 2020

(87) PCT Pub. No.: WO2019/191708
PCT Pub. Date: Oct. 3, 2019

(65) Prior Publication Data
US 2021/0037295 A1 Feb. 4, 2021

Related U.S. Application Data

(60) Provisional application No. 62/650,499, filed on Mar. 30, 2018.

(51) Int. Cl.
*H04N 21/8547* (2011.01)
*H04N 21/234* (2011.01)
(Continued)

(52) U.S. Cl.
CPC ... *H04N 21/8547* (2013.01); *H04N 21/23418* (2013.01); *H04N 21/435* (2013.01); *H04N 21/44218* (2013.01); *H04N 21/8133* (2013.01)

(58) Field of Classification Search
CPC ......... H04N 21/8547; H04N 21/23418; H04N 21/435; H04N 21/44218; H04N 21/8133;
(Continued)

(56) References Cited

U.S. PATENT DOCUMENTS

| 7,430,506 B2 | 9/2008 | Nam et al. |
| 7,461,055 B2 | 12/2008 | Atcheson et al. |

(Continued)

FOREIGN PATENT DOCUMENTS

| JP | 2004-128541 A | 4/2004 |
| KR | 10-2007-0097678 A | 10/2007 |
| KR | 10-2009-0121016 A | 11/2009 |

OTHER PUBLICATIONS

Associate, archived Oct. 5, 2015, URL=https://web.archive.org/web/20151005033849/www.dictionary.reference.com/browse/associate, download date Feb. 5, 2018, 16 pages.

(Continued)

*Primary Examiner* — Fernando Alcon
(74) *Attorney, Agent, or Firm* — Seed IP Law Group LLP

(57) ABSTRACT

A system that includes a content distributor, a reaction content server, and a plurality of viewer computer devices. The content distributor provides original content to the viewer computer devices. The viewer computer devices present the original content to viewers and generate viewer-reaction content of the viewers during presentation of the original content. The viewer computer devices provide the viewer-reaction content to the reaction content server to provide to other viewer computer devices. The viewer computer devices also present viewer-reaction content received from the reaction content server to the viewers in synchronization with the original content, which allows the viewers to experience other viewer's reactions while experiencing the same original content.

39 Claims, 7 Drawing Sheets

(51) Int. Cl.
*H04N 21/435* (2011.01)
*H04N 21/442* (2011.01)
*H04N 21/81* (2011.01)

(58) Field of Classification Search
CPC . H04N 21/235; H04N 21/6582; H04N 21/488
See application file for complete search history.

(56) References Cited

U.S. PATENT DOCUMENTS

| | | | |
|---|---|---|---|
| 7,617,296 B2 | 11/2009 | Bank | |
| 7,752,642 B2 | 7/2010 | Lemmons | |
| 7,882,034 B2 | 2/2011 | Hug et al. | |
| 7,987,280 B1 | 7/2011 | Putnam et al. | |
| 8,059,882 B2 | 11/2011 | Amidi | |
| 8,156,139 B2 | 4/2012 | Zatloukal et al. | |
| 8,437,461 B1 | 5/2013 | Gartner et al. | |
| 8,666,375 B2 | 3/2014 | Lee et al. | |
| 8,718,256 B2 | 5/2014 | Jeon | |
| 9,135,278 B2 | 9/2015 | Sutherland et al. | |
| 9,367,572 B2 | 6/2016 | Boic | |
| 9,443,001 B2 | 9/2016 | Rathnavelu et al. | |
| 10,070,177 B1* | 9/2018 | Gupta | H04N 21/44204 |
| 10,158,917 B1* | 12/2018 | Logan | G06F 3/011 |
| 2002/0057286 A1 | 5/2002 | Markel et al. | |
| 2002/0129364 A1 | 9/2002 | Smith et al. | |
| 2004/0105006 A1 | 6/2004 | Lazo et al. | |
| 2005/0229227 A1 | 10/2005 | Rogers | |
| 2005/0255901 A1 | 11/2005 | Kreutzer | |
| 2006/0129458 A1 | 6/2006 | Maggio | |
| 2008/0002021 A1 | 1/2008 | Guo et al. | |
| 2008/0022308 A1 | 1/2008 | Garcea | |
| 2008/0092164 A1 | 4/2008 | Agarwal et al. | |
| 2008/0120646 A1 | 5/2008 | Stern et al. | |
| 2008/0294694 A1 | 11/2008 | Maghfourian et al. | |
| 2009/0024554 A1 | 1/2009 | Murdock et al. | |
| 2009/0094656 A1 | 4/2009 | Carlucci | |
| 2009/0132361 A1 | 5/2009 | Titus et al. | |
| 2009/0138906 A1 | 5/2009 | Eide et al. | |
| 2009/0249223 A1 | 10/2009 | Barsook et al. | |
| 2009/0271826 A1 | 10/2009 | Lee et al. | |
| 2009/0276805 A1 | 11/2009 | Andrews, II et al. | |
| 2010/0088714 A1 | 4/2010 | Hawkins et al. | |
| 2010/0088726 A1 | 4/2010 | Curtis et al. | |
| 2010/0162303 A1 | 6/2010 | Cassanova | |
| 2010/0205635 A1 | 8/2010 | Boylan, III et al. | |
| 2010/0241961 A1 | 9/2010 | Peterson et al. | |
| 2010/0293598 A1 | 11/2010 | Collart et al. | |
| 2011/0041150 A1 | 2/2011 | Schein et al. | |
| 2011/0063317 A1 | 3/2011 | Gharaat et al. | |
| 2011/0067054 A1 | 3/2011 | Karaoguz et al. | |
| 2011/0135283 A1 | 6/2011 | Poniatowki et al. | |
| 2011/0179445 A1 | 7/2011 | Brown et al. | |
| 2011/0246908 A1 | 10/2011 | Akram et al. | |
| 2011/0251896 A1 | 10/2011 | Impollonia et al. | |
| 2011/0307332 A1 | 12/2011 | Kim et al. | |
| 2012/0023131 A1 | 1/2012 | Downey et al. | |
| 2012/0033850 A1 | 2/2012 | Owens et al. | |
| 2012/0311625 A1 | 12/2012 | Nandi | |
| 2013/0170818 A1 | 7/2013 | Klappert et al. | |
| 2013/0311287 A1 | 11/2013 | Jacobson et al. | |
| 2013/0332972 A1 | 12/2013 | Jacobson et al. | |
| 2014/0053061 A1 | 2/2014 | Chasen et al. | |
| 2014/0059595 A1 | 2/2014 | Jacobson et al. | |
| 2014/0067828 A1 | 3/2014 | Archibong et al. | |
| 2014/0096167 A1 | 4/2014 | Lang et al. | |
| 2014/0137144 A1 | 5/2014 | Järvenpää et al. | |
| 2014/0223464 A1* | 8/2014 | Moran | H04N 21/44222 725/12 |
| 2014/0317660 A1 | 10/2014 | Cheung et al. | |
| 2014/0325541 A1 | 10/2014 | Hannes et al. | |
| 2014/0344070 A1 | 11/2014 | Jacobson et al. | |
| 2015/0015690 A1 | 1/2015 | Roh et al. | |
| 2015/0094046 A1 | 4/2015 | Jung et al. | |
| 2015/0110471 A1 | 4/2015 | Zheng | |
| 2015/0120953 A1 | 4/2015 | Crowe et al. | |
| 2015/0350729 A1 | 12/2015 | Reynolds | |
| 2016/0098169 A1* | 4/2016 | Herdy | G06F 3/005 715/719 |
| 2016/0316251 A1 | 10/2016 | Choi et al. | |
| 2016/0366203 A1 | 12/2016 | Blong et al. | |
| 2016/0370975 A1 | 12/2016 | Collins et al. | |
| 2017/0019710 A1 | 1/2017 | Kim et al. | |
| 2017/0048681 A1 | 2/2017 | Gupta et al. | |
| 2017/0099519 A1 | 4/2017 | Dang et al. | |
| 2017/0099520 A1* | 4/2017 | Strickland | G06T 1/0007 |
| 2017/0147694 A1 | 5/2017 | Jiang et al. | |
| 2017/0208362 A1 | 7/2017 | Flores et al. | |
| 2017/0289619 A1 | 10/2017 | Xu et al. | |
| 2017/0358035 A1 | 12/2017 | Benfield et al. | |
| 2018/0067641 A1 | 3/2018 | Lerner et al. | |
| 2018/0352303 A1 | 12/2018 | Siddique et al. | |
| 2019/0197490 A1 | 6/2019 | Silva et al. | |
| 2019/0244639 A1* | 8/2019 | Benedetto | G11B 27/036 |
| 2019/0273954 A1* | 9/2019 | Evans | H04N 21/23418 |
| 2019/0349619 A1 | 11/2019 | Hou | |
| 2020/0045378 A1* | 2/2020 | Neumeier | H04N 21/26283 |
| 2020/0252691 A1 | 8/2020 | Lyons et al. | |

OTHER PUBLICATIONS

Hypervideo, Oct. 9, 2012, URL=https://en.wikipedia.org/w/index.php?title=Hypervideo&oldid=516731041, 6 pages.
Indicate, archived Sep. 26, 2015, URL=https://web.archive.org/web/20150926195236/www.dictionary.reference.com/browse/indicate, download date Feb. 5, 2018, 12 pages.
International Search Report and Written Opinion, dated Aug. 27, 2013, for International Application No. PCT/US2013/041693, 9 pages.
International Search Report and Written Opinion, dated Dec. 24, 2013, for International Application No. PCT/US2013/045502, 7 pages.
International Search Report and Written Opinion, dated Jun. 10, 2013, for International Application No. PCT/US2013/026744, 10 pages.
Kalal et al., "Face-TLD: Tracking-Learning-Detection Applied to Faces," *17th IEEE International Conference on Image Processing*, Hong Kong, China, Sep. 26-29, 2010, pp. 3789-3792.
Use VideoClix to create, manage, distribute, measure and monetize clickable videos today . . . , archived Jul. 28, 2013, URL=https://web.archive.org/web/20130728121225/www.videoclix.tv/pages/platform/index.php, download date Feb. 5, 2018, 2 pages.
PCT/US2019/025037—International Search Report and Written Opinion, dated Aug. 19, 2019, 15 pages.

* cited by examiner

SOCIALLY ANNOTATED AUDIOVISUAL CONTENT

This application claims the benefit of priority to U.S. Provisional Application No. 62/650,499, filed Mar. 30, 2018, which application is hereby incorporated by reference in its entirety.

TECHNICAL FIELD

The present disclosure is related generally to providing audiovisual content to a viewer, and particularly to annotating the audiovisual content presented to a first set of viewers with commentary provided by another set of viewers.

BACKGROUND

Description of the Related Art

The advent and expansion of personal computing devices and their capabilities have provided viewers with a platform to experience all types of audiovisual content. Likewise, advancements in speed and bandwidth capabilities of cellular and in-home networks have also expanded the viewer's audiovisual experience to nearly everywhere. Enabling viewers to view all types of audiovisual content in ever-expanding areas, however, has caused viewers to become less engaged with other viewers. Historically, if two friends wanted to watch a movie, they would gather at one of their houses and watch the movie. During the movie, the friends could discuss the movie, experience each other's reactions and emotions as the movie progresses, and even react based on their friend's reaction. Unfortunately, the individualistic atmosphere of today's mobile audiovisual content experience has greatly reduced this social component when experiencing audiovisual content. It is with respect to these and other considerations that the embodiments described herein have been made.

BRIEF SUMMARY

Briefly described, embodiments are directed toward systems and methods of providing content to viewers and allowing the viewers to generate additional content that is to be provided with the original content to other viewers.

A system may be summarized as including a server computer that includes a first memory that stores first computer instructions and a first processor that when executing the first computer instructions performs actions, the actions including: receiving a first data stream that includes first audiovisual content; analyzing the first audiovisual content to identify a moment-of-interest; in response to identifying the moment-of-interest, modifying the first data stream to include a capture-reaction flag indicating a start of the moment-of-interest; providing the modified first data stream to a first viewer computer device to present the first audiovisual content to a first viewer of the first viewer computer device; receiving, from the first viewer computer device, a second data stream that includes second audiovisual content of the first viewer generated during presentation of the moment-of-interest to the first viewer; and providing the modified first data stream and the second data stream to a second viewer computer device to present a combination of the first audiovisual content and the second audiovisual content to a second viewer of the second viewer computer device based on the capture-reaction flag.

The first viewer computer device may include a microphone, a camera, a second memory that stores second computer instructions, and a second processor that when executing the second computer instructions may perform actions, the actions including receiving the modified first data stream from the server computer; presenting the first audiovisual content from the modified first data stream to the first viewer; during the presentation of the first audiovisual content to the first viewer: analyzing the modified first data stream to identify the capture-reaction flag; and in response to identifying the capture-reaction flag, utilizing the microphone and the camera to generate the second audiovisual content of the first viewer during the moment-of-interest; generating the second data stream to include the second audiovisual content; and providing the second data stream to the server computer.

The second processor when executing the second computer instructions may perform further actions, the further actions including utilizing the microphone and the camera to generate third audiovisual content of the first viewer during presentation of the first audiovisual content to the first viewer; continuously buffering a predetermined amount of the third audiovisual content; in response to receiving an input from the first viewer to record the third audiovisual content, generating a third data stream with the currently buffered third audiovisual content; determining a timestamp of the first audiovisual content associated with a beginning of the currently buffered third audiovisual content; associating a beginning of the third data stream with the timestamp; and providing the third data stream and the timestamp to the server computer to provide to the second viewer computer device along with the modified first data stream for combined presentation based on the timestamp.

The second processor when executing the second computer instructions may perform further actions, the further actions including in response to receiving an input from the first viewer to record third audiovisual content, utilizing the microphone and the camera to generate the third audiovisual content of the first viewer; determining a timestamp associated with the first audiovisual content when the input was received; generating a third data stream with the third audiovisual content and associating a beginning of the third data stream with the timestamp; and providing the third data stream and the timestamp to the server computer to provide to the second viewer computer device along with the modified first data stream for combined presentation based on the timestamp.

The second processor when executing the second computer instructions may perform further actions, the further actions including in response to receiving an input from the first viewer to record third audiovisual content, pausing the presentation of the first audiovisual content to the first computer and utilizing the microphone and the camera to generate the third audiovisual content of the first viewer; determining a timestamp associated with the first audiovisual content when the input was received; generating a third data stream with the third audiovisual content and associating a beginning of the third data stream with the timestamp; restarting presentation of the first audiovisual content to the first viewer; and providing the third data stream and the timestamp to the server computer to provide to the second viewer computer device along with the modified first data stream for combined presentation based on the timestamp.

The second processor when executing the second computer instructions may perform further actions, the further actions including in response to generating the second audiovisual content: pausing the presentation of the first audiovisual content to the first viewer; overlaying the second audiovisual content on the first audiovisual based on the capture-reaction flag; and re-presenting the first audiovisual content with the overlaid second audiovisual content starting at the capture-reaction flag.

The second processor when executing the second computer instructions may perform further actions, the further actions including in response to generating the second audiovisual content: overlaying the second audiovisual content on the first audiovisual content; and continuing presentation of the first audiovisual content with the overlaid second audiovisual content, wherein the second audiovisual content is presented in a muted state.

The second processor when executing the second computer instructions may perform further actions, the further actions including in response to generating the second audiovisual content and prior to generating the second data stream, presenting a preview of the second audiovisual content to the first viewer; in response to receiving an input from the first viewer to save the second audiovisual content, generating the second data stream to include the second audiovisual content; and in response to not receiving the input from the first viewer to save the second audiovisual content, discarding the second audiovisual content.

The second viewer computer device may include a third memory that stores third computer instructions and a third processor that when executing the third computer instructions may perform actions, the actions including receiving the modified first data stream from the server computer; presenting the first audiovisual content from the modified first data stream to the second viewer; and during the presentation of the first audiovisual content to the second viewer: analyzing the modified first data stream to identify the capture-reaction flag; in response to identifying the capture-reaction flag, presenting the second audiovisual content to the second viewer during the moment-of-interest in the first audiovisual content; and resuming presentation of the first audiovisual content without the second audiovisual content after the moment-of-interest. Presenting the second audiovisual content to the second viewer may include combining the second audiovisual content of the first viewer from the second data stream with the first audiovisual content; and presenting the combined first audiovisual content and the second audiovisual content to the second viewer during the moment-of-interest in the first audiovisual content. Presenting the second audiovisual content to the second viewer may include pausing the presenting of the first audiovisual content to the second viewer; presenting the second audiovisual content to the second viewer; and in response to completion of presenting the second audiovisual content to the second viewer, resuming presentation of the first audiovisual content to the second viewer.

The third processor when executing the third computer instructions may perform further actions, the further actions including receiving, from the server computer, a third data stream that is associated with the capture-reaction flag and that includes third audiovisual content of a third viewer; and in response to the identifying of the capture-reaction flag, presenting the third audiovisual content to the second viewer.

The presenting of the second and third audiovisual content to the second viewer may further include determining a first priority of the of the first viewer and a second priority of the third viewer; and in response to a determination that the third viewer has a higher priority than the first viewer, presenting the third audiovisual content in an unmuted state and presenting the second audiovisual content in a muted state. The first priority of the first viewer and a second priority of the third viewer may be determined based on at least one of a viewer profile of the second viewer; a first viewer rating of the first viewer and a second viewer rating of the third viewer; a first number of followers of the first viewer and a second number of followers of the third viewer; or first demographics of the first viewer and second demographics of the third viewer relative to third demographics of the second user.

The third processor when executing the third computer instructions may perform further actions, the further actions including during the presentation of the second and third audiovisual content, receiving an input from the second viewer to unmute the second audiovisual content; and in response to receiving the input from the second viewer, presenting the second audiovisual content in an unmuted state and presenting the third audiovisual content in a muted state.

The third processor when executing the third computer instructions may perform further actions, the further actions including during the presentation of the second and third audiovisual content and in response to the third audiovisual content ending prior to the second audiovisual content, presenting a remainder of the second audiovisual content in an unmuted state.

A method may be summarized as including presenting first audiovisual content to a first viewer; during the presentation of the first audiovisual content to the first viewer: detecting a reaction by the first viewer to the first audiovisual content; and in response to the detection of the reaction of the first viewer: determining a timestamp associated with the first audiovisual content when the reaction was detected; generating second audiovisual content of the first viewer; and associating a beginning of the second audiovisual content with the timestamp; presenting the first audiovisual content to a second viewer; and during the presentation of the first audiovisual content to the second viewer: analyzing the first audiovisual content to identify the timestamp; and in response to identifying the timestamp, presenting the second audiovisual content to the second viewer.

The method may further include analyzing the first audiovisual content to identify a moment-of-interest; and in response to identifying a moment-of-interest, modifying the first audiovisual content to include a capture-reaction flag indicating a start of the moment-of-interest and a time during the presentation of the first audiovisual content to generate the second audiovisual content of the first viewer.

The method may further include analyzing the first audiovisual content to identify a moment-of-interest; in response to identifying a moment-of-interest, modifying the first audiovisual content to include a capture-reaction flag indicating a start of the moment-of-interest; during the presentation of the first audiovisual content to the first viewer: detecting the capture-reaction flag in the first audiovisual content; and generating third audiovisual content of the first viewer in response to detection of the capture-reaction flag; and during the presentation of the first audiovisual content to the second viewer: presenting the third audiovisual content to the second viewer.

The method may further include during the presentation of the first audiovisual content to the second viewer: receiving third audiovisual content to present to the second viewer; determining that a presentation of the third audiovisual content to the second viewer at least partially overlaps the presentation of the second audiovisual content to the second viewer. Determining that one of the third audiovisual content and the second audiovisual content has a higher priority and one has a lower priority; and presenting the higher priority audiovisual content to the second viewer in an unmuted state and presenting the lower priority audiovisual content to the second viewer in a muted state.

The method may further include determining that the presentation of the third audiovisual content to the second viewer has ended prior to an end of the presentation of the second audiovisual content to the second viewer; and presenting a remainder of the second audiovisual content to the second viewer in an unmuted state.

The method may further include in response to generating the second audiovisual content of the first viewer, presenting the second audiovisual content to the first viewer in a muted state while the presentation of the first audiovisual content to the first viewer continues.

The method may further include in response to generating the second audiovisual content of the first viewer, rewinding the presentation of the first audiovisual content to the first viewer based on the timestamp; and synchronously presenting the second audiovisual content along with the first audiovisual content to the first viewer.

A non-transitory computer-readable medium having stored contents that, when executed by a processor of a computing system, may cause the computing system to receive first audiovisual content from a server computer; present the first audiovisual content a first viewer; and during the presentation of the first audiovisual content to the first viewer: analyze the first audiovisual content to identify a capture-reaction flag to initiate generation of second audiovisual content of the first viewer; in response to identifying the capture-reaction flag, utilize a microphone and a camera to generate the second audiovisual content of the first viewer without input from the first viewer; provide the second audiovisual content to the server computer to be provided to other computing systems; analyze the first audiovisual content to identify a reaction-presentation flag to initiate presentation of third audiovisual content to the first viewer, the third audiovisual content being generated during presentation of the first audiovisual content to a second viewer; in response to identifying the reaction-presentation flag, request the third audiovisual content from the server computer; and in response to receiving the third audiovisual content, present the third audiovisual content to the first viewer in synchronization with the first audiovisual content.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including, but not limited to, the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references.

Figure 1:
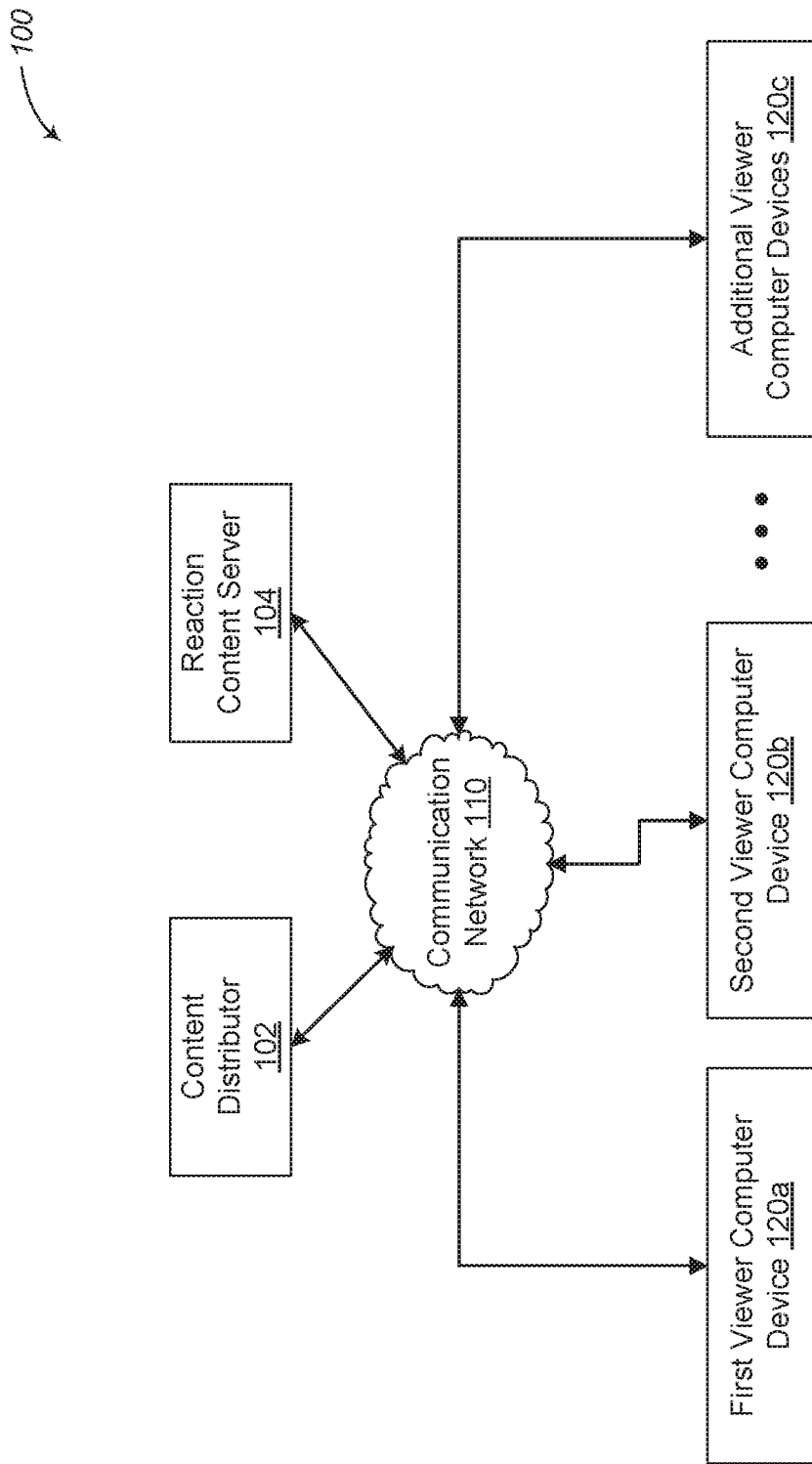
FIG. 1 is a context diagram of an environment for providing content to viewers in accordance with embodiments described herein.

FIG. 1 shows a context diagram of one embodiment of an environment 100 for providing content to a viewer in accordance with embodiments described herein. The environment 100 includes a content distributor 102 and a reaction content server 104 in communication with a plurality of viewer computer devices 120a-120c via a communication network 110. Examples of the viewer computer devices 120a-120c include smart phones, tablet computers, laptop computers, desktop computers, or other computing devices.

The content distributor 102 is a computer device, such as a server computer, that manages various different types of content for distribution to one or more viewer computer devices 120a-120c. For example, the content distributor 102 provides content to viewer computer devices 120a-120c for presentation to corresponding viewers. In general, the content is described herein as being audiovisual content, but in some embodiments, the content may also be video, audio, text, images, or some combination thereof. The content distributor 102 provides at least original content, and in some embodiments viewer-reaction content, to the viewer computer devices 120a-120c.

Original content is content that is generated or produced to be provided via one or more distribution methods to people (i.e., viewers or users) for viewing. For example, the content distributor 102 may provide original content to viewer computer devices 120a-120c via over-the-air television channels, subscription-based television channels, pay per view, on demand, streaming, or other distribution methods. Examples of original content include movies, sitcoms, reality shows, talk shows, game shows, documentaries, infomercials, news programs, sports broadcasts, commercials, advertisements, user-generated content, or other types of audiovisual content that is intended to be provided to people for viewing.

The reaction content server 104 is a computer device, such as a server computer, that also manages various different types of content for distribution to one or more viewer computer devices 120a-120c. For example, the content distributor 102 provides content to viewer computer devices 120a-120c for presentation to corresponding viewers. The reaction content server 104 provides at least viewer-reaction content, and in some embodiments original content, to the viewer computer devices 120a-120c.

Viewer-reaction content, compared to original content, is audiovisual content that is generated by a viewer computer device 120a-120c of a viewer as that viewer is experiencing original content. Examples of viewer-reaction content include statements or comments, expressions, reactions, movement, text, images, or other types of visual or audible actions by a viewer. One example of viewer-reaction content is a video of a viewer reacting to a surprising scene in the original content. Another example of viewer-reaction content is commentary provided by the viewer discussing the original content. Accordingly, viewer-reaction content can be virtually any type of content of a viewer that is created while the viewer is experiencing original content.

Viewer-reaction content may also include additional data that identifies the playing or presentation position of the original content to the viewer when the viewer-reaction content was generated. In this way, the viewer-reaction content from a first viewer can be synchronized with a particular portion of the original content when presenting the original content and the viewer-reaction content to a second viewer. Thus, the second viewer can experience both the original content and the first viewer's reaction as if they happened in real time with the presentation of the original content to the second viewer.

The viewer computing devices 120a-120c receive original content from the content distributor 102 and present the original content to corresponding viewers. The viewer computer device 120 sends a request to the content distributor 102 for original content. In some embodiments, the viewer computer devices 120a-120c also receive viewer-reaction content from the reaction content server 104 to be presented along with the original content so that the corresponding viewer of the viewer computer devices 120a-120c can experience other viewer's reactions, commentary, input, or other discussions about the original content. The viewer computer device 120 sends a request to the reaction content server 104 for one or more viewer-reaction content to present along with the original content. The reaction content server 104 provides such viewer-reaction content to the viewer computer device 120, which then overlays or otherwise combines the viewer-reaction content with the original content received from the content distributor 102 based on a timestamp associated with the viewer-reaction content indicating where in the presentation of the original content to present the viewer-reaction content, as described herein.

The viewer computer devices 120a-120c also capture, record, or otherwise generate viewer-reaction content in response to the corresponding viewer experiencing the original content, which may include viewer-reaction content from one or more other viewers. The viewer computer devices 120a-120c then provide this viewer-reaction content to the content distributor 102 to be provided to other viewer computer devices 120a-120c, such as discussed below in conjunction with FIG. 2. In some other embodiments, the viewer-reaction content may also be generated in response to the viewer reacting to experiencing other viewer-reaction content that is being presented to that viewer. In this way, the original content is annotated with viewer reactions and commentary to create a social experience for each viewer.

Although the content distributor 102 and the reaction content server 104 are described in some embodiments as separate computing devices, embodiments are not so limited. In other embodiments, the functionality of the content distributor 102 and the reaction content server 104 may be provided by a single computing device or collection of multiple computing devices working together. For example, in some embodiments, a server computing device may modify or combine the viewer-reaction content with the original content to be provided to the viewer computer device 120 as one or more audiovisual data streams. One such example if such combined functionality is described below in conjunction with FIGS. 3 and 4.

The communication network 110 may be configured to couple various computing devices to transmit content/data from one or more computing devices to one or more other computing devices. For example, communication network 110 may be the Internet, X.25 networks, or a series of smaller or private connected networks that carry the content and other data. Communication network 110 may include one or more wired or wireless networks.

Figure 2:
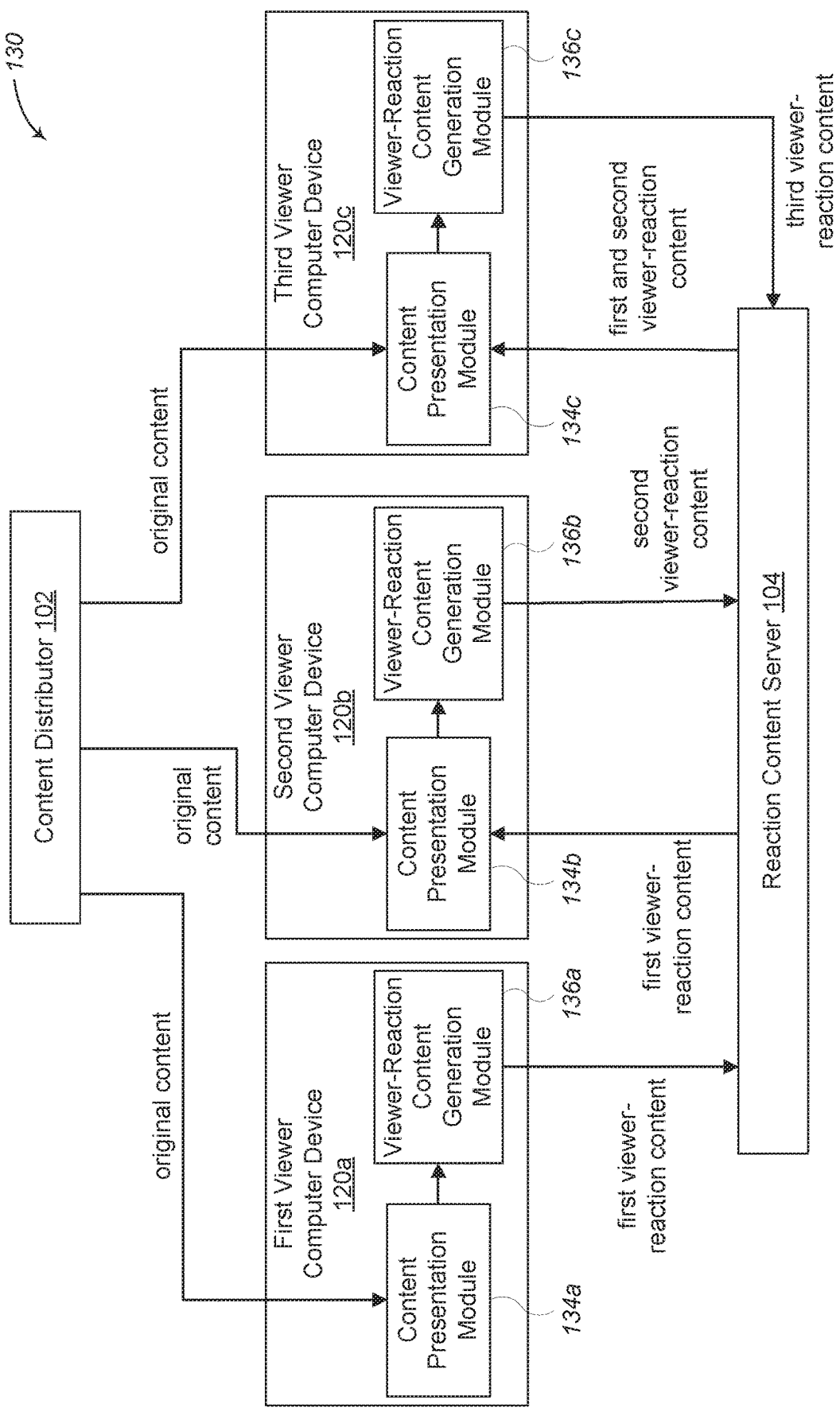
FIG. 2 is a context diagram of one non-limiting embodiment of a content distributor providing original content and viewer-reaction content to viewer computer devices for display to the viewer and to generate additional viewer-generated content in accordance with embodiments described herein.

FIG. 2 is a context diagram of one non-limiting embodiment of a content distributor providing original content and a reaction content server 104 providing viewer-reaction content to viewer computer devices for display to the viewer and to generate additional viewer-generated content in accordance with embodiments described herein. Example 130 shows one example of the flow of content between a content distributor 102, a reaction content server 104, and a plurality of viewer computer devices 120a-120c.

In this illustrated embodiment, the viewer computer devices 120a-120c include a content presentation module 134 and a viewer-reaction content generation module 136. Briefly, the content presentation module 134 displays or other otherwise presents original content and previously generated viewer-reaction content to a viewer of a corresponding viewer computer devices 120, and the viewer-reaction content generation module 136 generates viewer-reaction content as the corresponding viewer is experiencing the original content or previously generated viewer-reaction content.

In some embodiments, as described herein, the content presentation module 134 may instruct the viewer-reaction content generation module 136 when to generate viewer-reaction content (e.g., if the original content incudes one or more capture-reaction flags). In other embodiments, a corresponding viewer interacts with the viewer-reaction content generation module 136 to provide input indicating when to generate the viewer-reaction content. The viewer-reaction content generation module 136 also associates the viewer-reaction content with a timestamp associated with the original content for the playing or presentation position of the original content when the viewer-reaction content was generated. The viewer-reaction content generation module 136 may also modify the viewer-reaction content to include an identifier of the viewer or the viewer computer device 120.

The functionality of the content presentation module 134 and the viewer-reaction content generation module 136 may be provided via applications, content presentation interfaces, web browsers, browser plug-ins, or other computing processes or modules executing on a viewer computer devices 120. Although the content presentation module 134 and the viewer-reaction content generation module 136 are illustrated as being separate, embodiments are not so limited and their functionality may be combined into a single module or separated into additional modules not shown. Similarly, the functionality of the content presentation module 134 and the viewer-reaction content generation module 136 may be at least partially performed by the content distributor 102 or reaction content server 104, such as via an interactive web interface. But for ease of discussion, embodiments are described herein with the functionality of the content presentation module 134 and the viewer-reaction content generation module 136 being performed by the viewer computer devices 120*a*-120*c*.

The content distributor 102 provides original content to a content presentation module 134*a* of a first viewer computer device 120*a*. The content presentation module 134*a* presents the original content to a first viewer of the first viewer computer device 120*a*. As the first viewer is experiencing the original content, a viewer-reaction content generation module 136*a* of the first viewer computer device 120*a* generates first viewer-reaction content by recording or otherwise capturing the first viewer's reactions (e.g., comments, expressions, etc.) to the original content. The viewer-reaction content generation module 136*a* then provides the first viewer-reaction content to the reaction content server 104.

The content distributor 102 can then provide the original content to a content presentation module 134*b* of a second viewer computer device 120*b* in response to a request from the second viewer computer device 120*b* for the original content. The content presentation module 134*b* requests the first viewer-reaction content from the reaction content server 104 (e.g., by sending a request to the reaction content server 104 for any viewer-reaction content stored by the reaction content server 104 for the original content). The content presentation module 134*b* presents the original content and the first viewer-reaction content to a second viewer of the second viewer computer device 120*b*. In various embodiments, the content presentation module 134*b* combines, overlays, or otherwise prepares the first viewer-reaction content to be presented to the second viewer along with the original content at the same temporal presentation position in the original content as when the first viewer-reaction content was generated. As the second viewer is experiencing the original content and the first viewer-reaction content, a viewer-reaction content generation module 136*b* of the second viewer computer device 120*b* generates second viewer-reaction content by recording or otherwise capturing the second viewer's reactions. The viewer-reaction content generation module 136*b* then provides the second viewer-reaction content to the reaction content server 104.

The content distributor 102 can then provide the original content to a content presentation module 134*c* of a third viewer computer device 120*c* in response to a request from the third viewer computer device 120*c* for the original content. The content presentation module 134*c* requests the first and second viewer-reaction content from the reaction content server 104 (e.g., by sending a request to the reaction content server 104 for any viewer-reaction content stored by the reaction content server 104 for the original content). In various embodiments, the first viewer-reaction content and the second viewer-reaction content are provided to the third viewer computer device 120*c* via separate data streams, which may be separate from the original content data stream. The content presentation module 134*c* presents the original content, the first viewer-reaction content, and the second viewer-reaction content to a third viewer of the third viewer computer devices 120*c*.

In various embodiments, the content presentation module 134*c* combines, overlays, or otherwise prepares the first viewer-reaction content and the second viewer-reaction content to be presented to the second viewer. In some situations, the first viewer-reaction content and the second viewer-reaction content may not overlap because they occur at different temporal presentation positions of the original content. In other situations, however, the first and second viewer-reaction content may at least partially overlap. Accordingly, the content presentation module 134*c* can select which viewer-reaction content to present to the third viewer, or it can select to present both viewer-reaction content at the same time but with one presented in an unmuted state and the other presented in a muted state. For example, each viewer-reaction content may include a priority (e.g., based on the viewer associated with the viewer-reaction content, or based on which viewer-reaction content was generated first), and the viewer-reaction content with the highest priority is presented to the third viewer in an unmuted state and the other being presented in a muted state.

As the third viewer is experiencing the original content and the first and second viewer-reaction content, a viewer-reaction content generation module 136*c* of the third viewer computer device 120*c* generates third viewer-reaction content by recording or otherwise capturing the third viewer's reactions. The viewer-reaction content generation module 136*c* then provides the third viewer-reaction content to the reaction content server 104 for distribution to other viewer computer devices.

Although FIGS. 1 and 2 illustrate and discuss three viewer computer devices 120*a*-120*c* and three viewers, embodiments are not so limited. Rather, embodiments described herein may be employed with n viewers, where n viewers is a plurality of viewers.

The operation of certain aspects will now be described with respect to FIGS. 3-6. Process 150 described in conjunction with FIG. 3 and process 175 described in conjunction with FIG. 4 are complementary processes for employing a content distributor to maintain and distribute original content and viewer reactions to a viewer. In various embodiments, process 150 may be implemented by or executed on one or more computing devices, such as the content distributor 102 in FIG. 1; and process 175 may be implemented by or executed on one or more other computing devices, such as one or more of the viewer computer devices 120a-120c in FIG. 1. Process 200 described in conjunction with FIG. 5 and process 250 described in conjunction with FIG. 6 are complementary processes for employing a reaction content server to maintain and distribute viewer reactions to a viewer. In various embodiments, process 200 may be implemented by or executed on one or more computing devices, such as the viewer reaction server 104 in FIG. 1; and process 250 may be implemented by or executed on one or more other computing devices, such as one or more of the viewer computer devices 120a-120c in FIG. 1.

Figure 3:
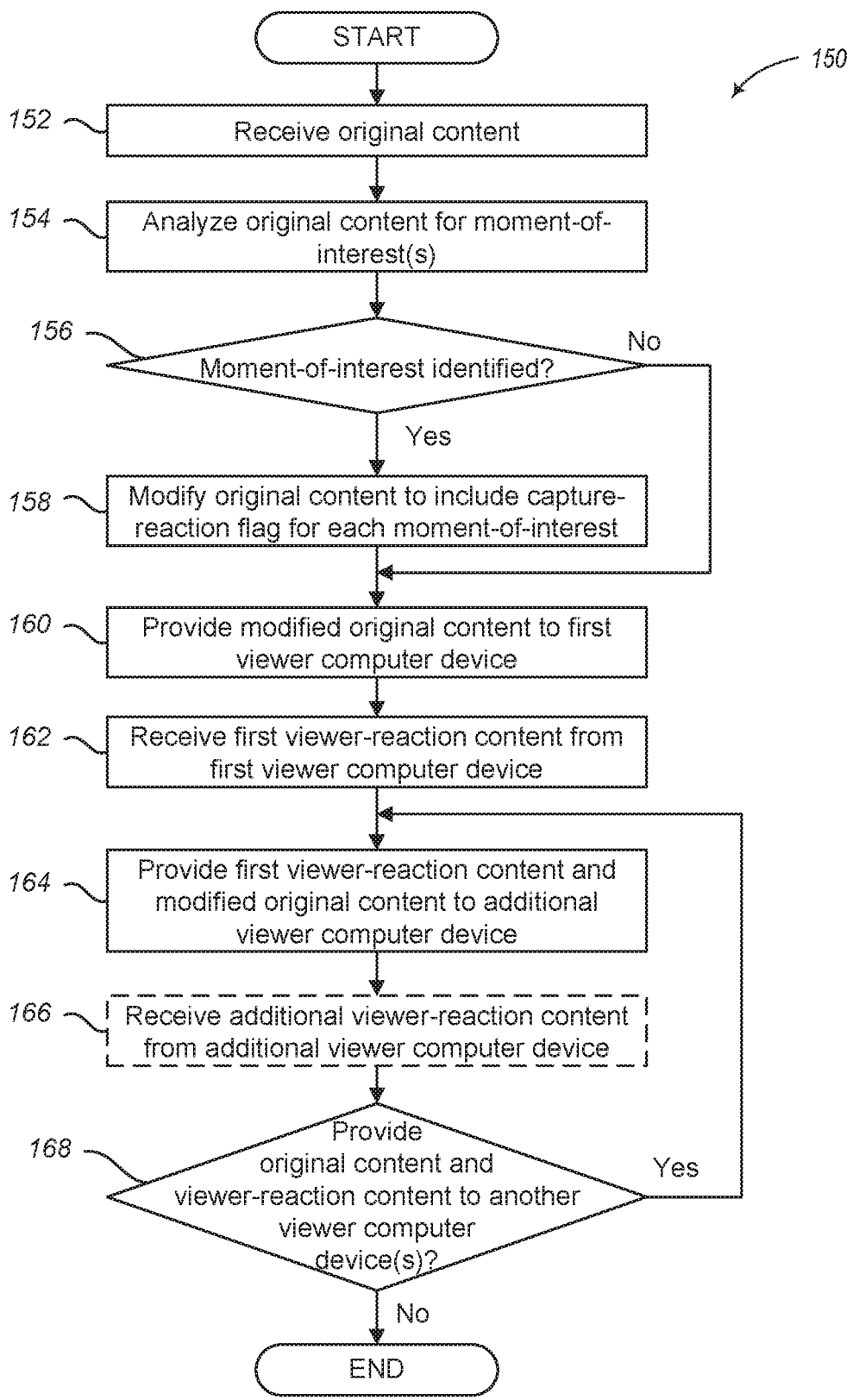
FIG. 3 is a logical flow diagram showing one embodiment of an overview process by a content distributor for providing original content and viewer-reaction content to viewers in accordance with embodiments described herein.
Figure 4:
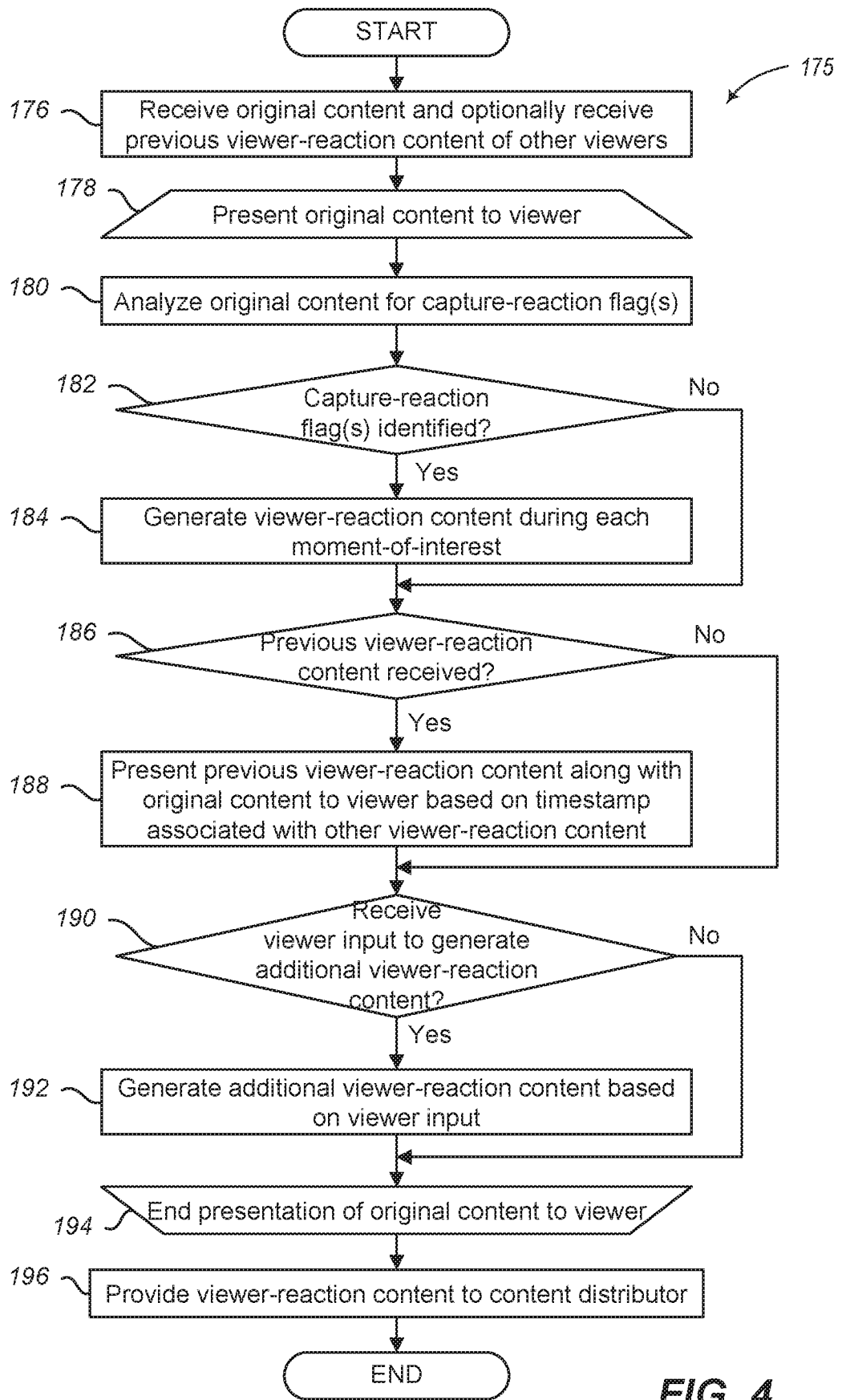
FIG. 4 is a logical flow diagram of one embodiment of an overview process by a viewer computer device for presenting content to a viewer and generating viewer-reaction content of the viewer in accordance with embodiments described herein.

FIG. 3 illustrates a logical flow diagram showing one embodiment of an overview process 150 by a content distributor for receiving and providing original content and previously generated viewer-reaction content to viewers in accordance with embodiments described herein. Process 150 begins, after a start block, at block 152, where original content is received by the content distributor. As mentioned above, the original content may be movies, television programs, news reports, viewer-generated content, or other types of audiovisual content.

Process 150 proceeds to block 154 where the original content is analyzed for one or more moments-of-interest. A moment-of-interest is a time period or point in the original content where the system automatically records a viewer's reaction when viewing the original content (e.g., at block 184 in FIG. 4).

In some embodiments, a moment-of-interest may be defined by an administrator or by the content creator. For example, in some embodiments, the administrator or content creator can utilize a graphical user interface to manually input user commands to identify one or more moments-of-interest. Similarly, viewers can provide manual user input when experiencing original content to identify a moment-of-interest. In at least some embodiments, the moment-of-interest is identified if a threshold number or percentage of viewers, or some other statistical data, identify a moment-of-interest.

In various embodiments, the system may continuously record data associated with the viewer (e.g., via one or more audio or visual inputs) during the presentation of the original content. When a moment-of-interest is identified in the original content—by previously determined capture-reaction flags, manual user button clicks, user movement or reaction (visual or audible) by a viewer, or other automatic or manual mechanism—the system identifies a portion of the continuously recorded data associated with the moment-of-interest as the audiovisual content containing the viewer's reaction.

In other embodiments, image processing techniques may be utilized on the original content to identify a moment-of-interest. This analysis may be compared to a plurality of rules that define a moment-of-interest. Thus, a moment-of-interest may be defined by a sudden change in the content, such as if there is an explosion; a change in the music volume; a change in the scene; a change in the characters; some other attribute of the original content; or some combination thereof. In one non-limiting, non-exhaustive example, a commercial break in a television program or credits at the end of a movie may be considered to be a moment-of-interest because it provides a break in the substance of the content that provides viewers a good opportunity to provide comments or feedback on what they just watched. As another example, a car flying off a bridge may be moment-of-interest.

In at least one embodiment, the duration of a moment-of-interest may be a predefined time period, such as 30 seconds. In other embodiments, the duration of the moment-of-interest may be determined by the analysis of the original content. For example, if the moment-of-interest is identified by an explosion, then the duration of the moment-of-interest may be until the explosion ends. In yet other embodiments, the duration of the moment-of-interest may not be determined, rather, as discussed in more detail below, the moment-of-interest is used to start the recording of a viewer's reaction, but the end of the recording is determined by viewer input or an end in the viewer's reaction (e.g., if the viewer stops commenting).

In some other embodiments, a moment-of-interest is defined by previously provided viewer-reaction content from one or more viewers. For example, if a previous viewer provided 30 seconds of viewer-reaction content starting at 0:10:00 (hours:minutes:seconds) into the original content, then a moment-of-interest may be identified as being from 0:10:00 to 0:10:30. In some embodiments, this moment-of-interest may be modified to begin early than the previously provided viewer-reaction content to accommodate for the time it took the previous viewer to react to the original content. In other embodiments, the moment-of-interest may be modified to bend later than the previously provided viewer-reaction content to accommodate for additional time for a subsequent viewer to react to the previous viewer.

In at least one embodiment, the moment-of-interest may be determined based on statistical data from previous users. For example, if more than 10% of viewers reacted at a particular point or time period in the original content, then that particular point or time period may be determined to be a moment-of interest. In another example, if more than 50 viewers reacted at a particular point or time period in the original content, then that particular point or time period may be determined to be a moment-of interest. These examples are for illustrative purposes and are not to be considered exhaustive or limiting.

Process 150 continues at decision block 156, where a determination is made whether one or more moments-of-interest are identified in the original content. If a moment-of-interest is identified in the original content, then process 150 flows to block 158; otherwise, process 150 flows to block 160.

At block 158, the original content is modified to include a capture-reaction flag for each identified moment-of-interest. The capture-reaction flag is used as a trigger to begin recording a viewer's reaction while the viewer is viewing the original content.

In various embodiments, metadata associated with the original content is modified to include the capture-reaction flags. In some embodiments, the capture-reaction flag may be included in metadata that is synchronized with the original content. For example, the capture-reaction flag may be a start/stop tag or identifier in the metadata at specific times to trigger the starting and ending of the recording of a viewer's reaction.

In other embodiments, the capture-reaction flag may be included in a header or other data not synchronized with the original content. For example, capture-reaction flag may be a timestamp indicating when a moment-of-interest occurs in the original content. The capture-reaction flag may also include a duration indicating how long to capture the viewer's reaction associated with the moment-of-interest. In some embodiments, the capture-reaction flag may be modified to begin recording of the viewer's reactions prior to a moment-of-interest, which can be utilized to capture the viewer's reaction prior to and during the moment-of-interest.

In some other embodiments, the capture-reaction flag may be a logo, text, icon, or other marker added or overlaid onto the actual content, rather than in the metadata. In this way, a viewer computer device can perform image recognition on the original content for the capture-reaction flag. This type of capture-reaction flag also serves as an indicator to the viewer that their reaction is being captured.

After block 158, or if a moment-of-interest is not identified at decision block 156, process 150 proceeds to block 160. At block 160, the modified original content is provided to a first viewer computer device. In various embodiments, the original content is provided to the first viewer computer as a single data stream. In other embodiments, the original content is provided to the first viewer computer as multiple data streams, such as a video data stream, an audio data stream, and a metadata data stream.

In some embodiments, blocks 154, 156, and 158 may be optional and may not be performed. In at least one such embodiment, the original content in an unmodified form (i.e., does not include any capture-reaction flags) is provided to the first viewer computer device.

Process 150 continues at block 162, where first viewer-reaction content is received from the first viewer computer device. As discussed in more detail below in conjunction with FIG. 4, the first viewer-reaction content may be automatically captured during a moment-of-interest or it may be manually captured in response to viewer input. In some embodiments, a viewer may capture one or multiple different reactions at different times during the presentation of the original content. In some embodiments, the content distributor may receive, from the first viewer computer device, a separate data stream with separate viewer-reaction content for each separately captured viewer reaction. In other embodiments, the content distributor may receive, from the first viewer computer device, a single data stream with multiple captured viewer reactions combined into the first viewer-reaction content (i.e. a single viewer-reaction content item).

The content distributor also receives a timestamp associated with the first viewer-reaction content. This timestamp identifies the point in time or a time period in the original content when the first viewer-reaction content was generated. For example, the timestamp may be the same timestamp as the capture-reaction flag if the first viewer-reaction content was generated in response to the capture-reaction flag. In another example, the timestamp may be when a viewer input a command to record the first viewer-reaction content.

In some embodiments, the original content is modified to include reaction-presentation flags to indicate when, during the presentation of the original content, to present a corresponding viewer-reaction content. In at least one embodiment, the reaction-presentation flag identifies the timestamp associated with the corresponding viewer-reaction content and an identifier of the corresponding viewer-reaction content. Similar to the capture-reaction flags, the reaction-presentation flags may be included in synchronous metadata or it may be included in non-synchronous metadata that accompanies the original content.

Process 150 proceeds next to block 164, where the first viewer-reaction content and the modified original content is provided to an additional viewer computer device, such as a second viewer computer device. In various embodiments, block 164 employs embodiments of block 160 to provide the original content to the viewer computer device.

Process 150 continues next at block 166, where additional viewer-reaction content, such as second viewer-reaction content, is received from the second viewer computer device. In at least one embodiment, block 166 is optional and may not be performed, such as when the viewer of the second computer device does not record any viewer reactions. In other embodiments where block 166 is performed, block 166 employs embodiments of block 162 to receive the second viewer-reaction content.

Process 150 proceeds to decision block 168, where a determination is made whether to provide the original content and the viewer-reaction content, or just the original content, to another viewer computer device. If content is provided to another viewer computer device, then process 150 returns to block 164 to provide the modified, or unmodified, original content to another viewer computer device, and optionally viewer-reaction content from one or more other viewers. Otherwise, process 150 terminates or otherwise returns to a calling process to perform other actions.

As demonstrated above with respect to the loop associated with decision block 168, viewer-reaction content may be received from a plurality of different viewers for a plurality of different portions of the original content. Accordingly, in some embodiments, content distributor may provide viewer-reaction content from a plurality of different viewers to the second viewer computer device. In at least one such embodiment, each separate viewer-reaction content is provided to the second viewer computer device as a separate data stream. In another embodiment, a plurality of separate viewer-reaction content items are combined into a single data stream.

In various embodiments, the content distributor dynamically selects which viewer-reaction content—from a plurality of viewer-reaction content items—to provide to which viewer computer devices. For example, in some embodiments, the content distributor can rank a plurality of viewer-reaction content items based on popularity (e.g., the number of viewers that provide an approval of the viewer-reaction content or the number of viewers that viewed the viewer-reaction content in its entirety, rather than stop it early or click on other viewer-reaction content) and provide a highest two or three (or other number) to a viewer computer device. In other embodiments, the content distributor can provide viewer-reaction content from only those viewers approved by or are social network friends of the recipient viewer.

Moreover, the selection of viewer-reaction content to provide to a viewer computer device may be based on its relationship to the original content. For example, the content distributor may store 100 different viewer-reaction content items for the original content at time 0:10:00. But the content distributor may provide a predetermined subset (e.g., three) to the viewer computer device.

As mentioned above, the original content may be modified to include reaction-presentation flags for the first viewer-reaction content. Similarly, the original content may be modified to include reaction-presentation flags for each of the selected viewer-reaction content.

FIG. 4 illustrates a logical flow diagram of one embodiment of an overview process 175 by a viewer computer device for presenting content to a viewer and generating viewer-reaction content of the viewer in accordance with embodiments described herein. Process 175 begins, after a start block, at block 176, where the viewer computer device receives the original content from the content distributor. In some embodiments, the viewer computer device also receives one or more previous viewer-reaction content items from the content distributor. As mentioned herein, each separate viewer-reaction content item may be received as a separate data stream. In some embodiments, however, multiple viewer-reaction content items may be received as a single data stream.

In at least one embodiment, all previous viewer-reaction content items are received prior to the original content being presented to the viewer. In another embodiment, the previous viewer-reaction content items are received when they are to be presented to the viewer. For example, the original content may include a synchronous metadata data stream that includes reaction-presentation flags at particular times throughout the original content. During presentation of the original content, this metadata is analyzed to identify each reaction-presentation flag. When a reaction-presentation flag is identified, the viewer computer device sends a request to the content distributor to provide the corresponding previous viewer-reaction content.

In other embodiments, the content distributor may be streaming the original content to the viewer computer device and may monitor the stream for the reaction-presentation flags, and send the corresponding previous viewer-reaction content items to the viewer computer device without the viewer computer device having to look for the reaction-presentation flags.

Process 175 proceeds to block 178, where the original content is presented to the viewer of the viewer computer device. In some embodiments, the original content is provided to a display device or a speaker to present the original content to the viewer. During presentation of the original content to the viewer, process 175 proceeds to block 180.

At block 180, the original content is analyzed for capture-reaction flags. In some embodiments, metadata associated with the original content is analyzed for capture-reaction flags. If the capture-reaction flags are included in a header of the original content, then only a single review of the header for the capture-reaction flags is performed. However, if capture-reaction flags are included in metadata that is synchronized with the original content, then this metadata is continuously monitored to identify a capture-reaction flag.

Process 175 continues at decision block 182, where a determination is made whether a capture-reaction flag is identified in the original content. If a capture-reaction flag is identified, then process 175 flows to block 184; otherwise, process 175 flows to decision block 186.

At block 184, viewer-reaction content is generated during each moment-of-interest associated with the identified capture-reaction flags. In various embodiments, the generation of the viewer-reaction content is performed by utilizing a camera or microphone, or both, to capture and record the viewer. This recording can capture the viewer's facial expressions, commentary, movement, or other words or actions performed of the viewer.

In some embodiments, the capture-reaction flag includes a duration for which to record the viewer and to generate the viewer-reaction content. In other embodiments, the capture-reaction flag indicates a start of recording and the recording ends at another capture-reaction flag, ends when the viewer inputs an end recording command, ends after a predetermined amount of time, or ends when the viewer's reaction ends (e.g., the viewer stops talking).

In some embodiments, the viewer-reaction content is presented to the viewer in a preview window for review by the viewer. For example, the viewer-reaction content may be overlaid onto the original content as a picture-in-picture format. The viewer can then click on or otherwise select the newly generated viewer-reaction content to review the viewer-reaction content prior to it being saved or otherwise provided to the content distributor. In at least one embodiment, the viewer-reaction content is presented to the viewer in a muted state as the presentation of the original content continues. In this way, the substance of the original content is not impacted by the replaying of the viewer-reaction content. In another embodiment, the original content is "rewound" and the viewer-reaction content is synchronously presented to the viewer when it was captured. In this way, the viewer can preview the viewer-reaction content along with the original content to see what other viewers will see. If the viewer likes the viewer-reaction content, then the viewer can provide input to save the viewer-reaction content. Otherwise, the viewer-reaction content is deleted, and in some embodiments, the viewer is presented with the option to re-generate the viewer-reaction content. Or, in other embodiments, the viewer-reaction content is automatically saved and user input is needed to delete or re-record the viewer-reaction content.

After block 184 or when no capture-reaction flags are identified at decision block 182, process 175 proceeds to decision block 186. At decision block 186, a determination is made whether previous viewer-reaction content is received from the content distributor at block 176. In some embodiments, this determination is based on whether the viewer computer device identifies a reaction-presentation flag in the original content or whether the viewer computer device receives additional data streams with the previous viewer-reaction content from the content distributor. If previous viewer-reaction content is received, process 175 flows to block 188; otherwise, process 175 flows to decision block 190.

At block 188, the previous viewer-reaction content is presented to the viewer along with the original content. As described herein, e.g., at block 192 below, each viewer-reaction content is associated with a timestamp in the original content. In this way, the viewer-reaction content is presented to the viewer at the same point in the original content as when the viewer-reaction content was generated. Thus, the viewer can experience the reaction of another viewer, even though the other viewer is not in the same room and viewed the original content at an earlier time.

In various embodiments, the previous viewer-reaction content is overlaid onto the original content. For example, the previous viewer-reaction content may be presented as a thumbnail or smaller version over a portion or one of the corners of the original content. In other embodiments, the previous viewer-reaction content is presented to the viewer in a separate viewing window as the original content. Thus, the original content is not blocked by the presentation of the previous viewer-reaction content.

In some embodiments, where multiple previous viewer-reaction content items are to be presented at the same time (i.e., have overlapping timestamps or durations), the view computer device can display all of the previous viewer-reaction content at the same time, e.g., next to each other or partially overlapping, or it can display a highest priority or closest friend viewer-reaction content. Likewise, in some embodiments, the highest priority viewer-reaction content may be presented in an unmuted state with the remainder previous viewer-reaction content being presented in a muted state. Once the higher priority viewer-reaction content ends, one of the muted viewer-reaction content may be automatically or manually unmuted.

In various embodiments, the priority of the previous viewer-reaction content is based on at least one of a profile of the current viewer, viewer ratings of the previous viewers associated with the previous viewer-reaction content, the number of followers of the previous viewers (e.g., how many viewers subscribe or routinely view viewer-reaction content from a particular viewer), demographics of the previous viewers relative to demographics of the current viewer (e.g., similar age, located in a same geographic area, etc.), or other factors.

During the presentation of the previous viewer-reaction content, the viewer can interact with the previous viewer-reaction content. For example, the viewer can mute or pause first viewer-reaction content and unmute second viewer-reaction content. Additionally, in some embodiments, the original content may be paused or muted white the previous viewer-reaction content is being presented to the viewer.

After block 188 or if previous viewer-reaction content is not received at decision block 186, process 175, proceeds to decision block 190. At decision block 190, a determination is made whether viewer input has been received to generate additional viewer-reaction content for the viewer of the viewer computer device. In at least one embodiment, the viewer may utilize a button click to start and stop the process of recording the viewer's reaction. In other embodiments, the viewer may hold down a button to record the viewer's reaction. If viewer input is received to record the viewer's reaction and to generate the additional viewer-reaction content, then process 175 flows to block 192; otherwise, process 175 flows to block 194.

At block 192, additional viewer-reaction content is generated based on the viewer input. In various embodiments, the generation of the additional viewer-reaction content is performed by utilizing a camera or microphone, or both, to capture and record the viewer. This recording can capture the viewer's facial expressions, commentary, movement, or other words or actions performed of the viewer. Similar to what is described above in conjunction with block 184, the viewer can preview the generated viewer-reaction content prior to it being saved or otherwise provided to the content distributor.

Along with capturing the viewer's reaction, the viewer computer device also determines and records a timestamp associated with the original content. In various embodiments, this timestamp is the timestamp of the original content when the viewer input was received. In at least one embodiment, the timestamp also includes a duration of the viewer-reaction content.

In some embodiments, the viewer input may also include a command to pause the presentation of the original content. In this way, the viewer can record a comment or some other reaction without missing any of the substance of the original content. Similarly, the viewer can input a pause-on-viewing command, which accompanies the viewer-reaction content when it is provided to the content distributor. When another viewer computer device later presents that viewer-reaction content to another viewer, the presentation of the original content to that other viewer is paused so that the viewer-reaction content does not distract from the substance of the original content, which could otherwise cause the other viewer to miss something in the original content.

After block 192, process 175 continues to block 194, where the presentation of the original content to the viewer ends. Viewer-reaction content can be generated throughout the presentation of the original content to the viewer, such as by viewer input or in response to a capture-reaction flag in the original content. Similarly, previous viewer-reaction content can be presented to the viewer throughout the presentation of the original content to the viewer, such as based on a reaction-presentation flag in the original content. Accordingly, viewer-reaction content can be generated at the same time previous viewer-reaction content is being presented to the viewer.

Process 175 continues at block 196, where the viewer-reaction content generated at block 184 or block 192 is provided to the server computer. As mentioned above, the viewer computer device provides the viewer-reaction content and the corresponding timestamp in the original content to the content distributor for distribution to other viewer computer devices.

After block 196, process 175 terminates or otherwise returns to a calling process to perform other actions.

Although FIG. 4 shows the viewer-reaction content as being provided to the content distributor after the end of the presentation of the original content, embodiments are not so limited. In some embodiments, the viewer-reaction content is provided to the content distributor as or after it is recorded but while the original content is still being presented to the viewer.

Figure 5:
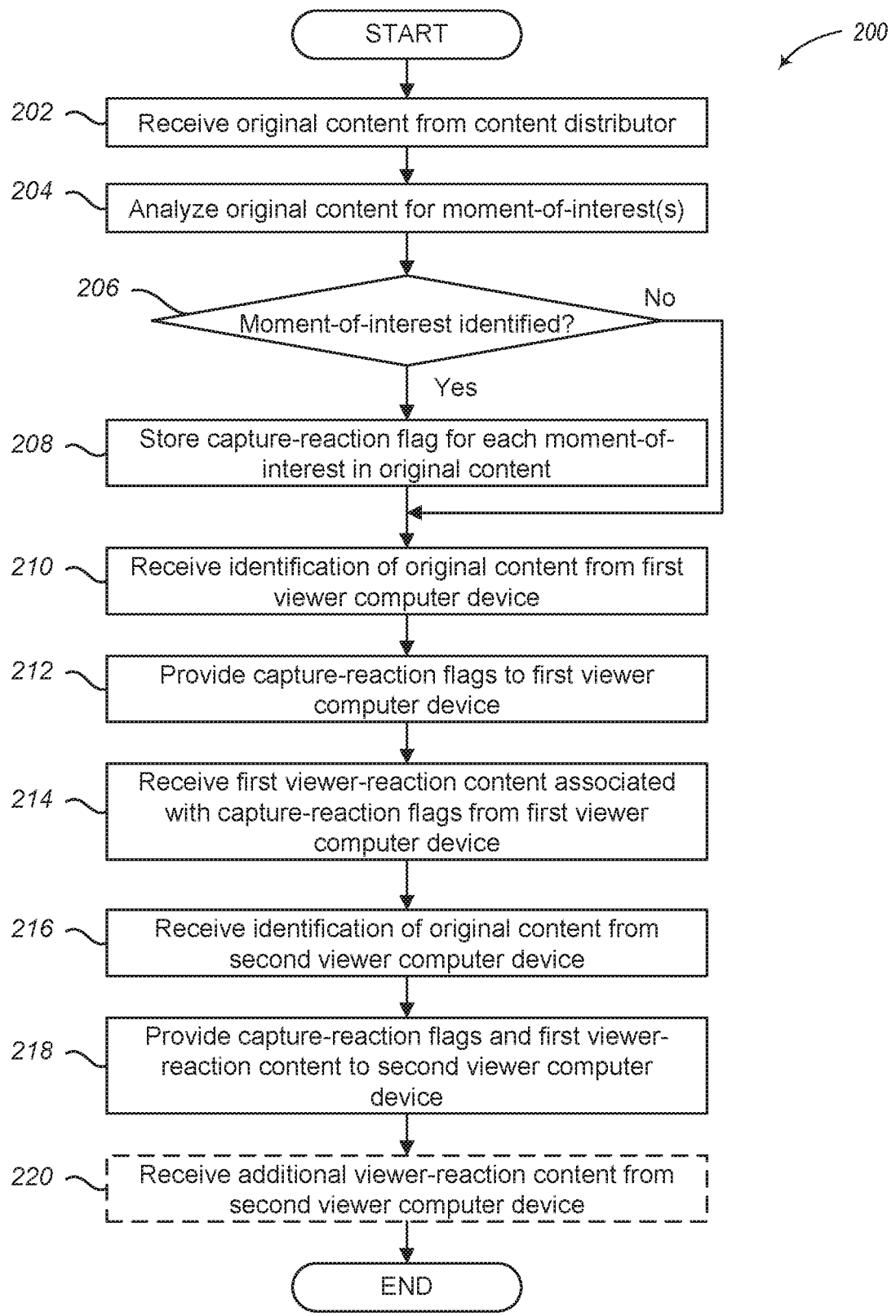
FIG. 5 is a logical flow diagram showing one embodiment of an overview process by a reaction content server for providing viewer-reaction content to viewers in accordance with embodiments described herein.
Figure 6:
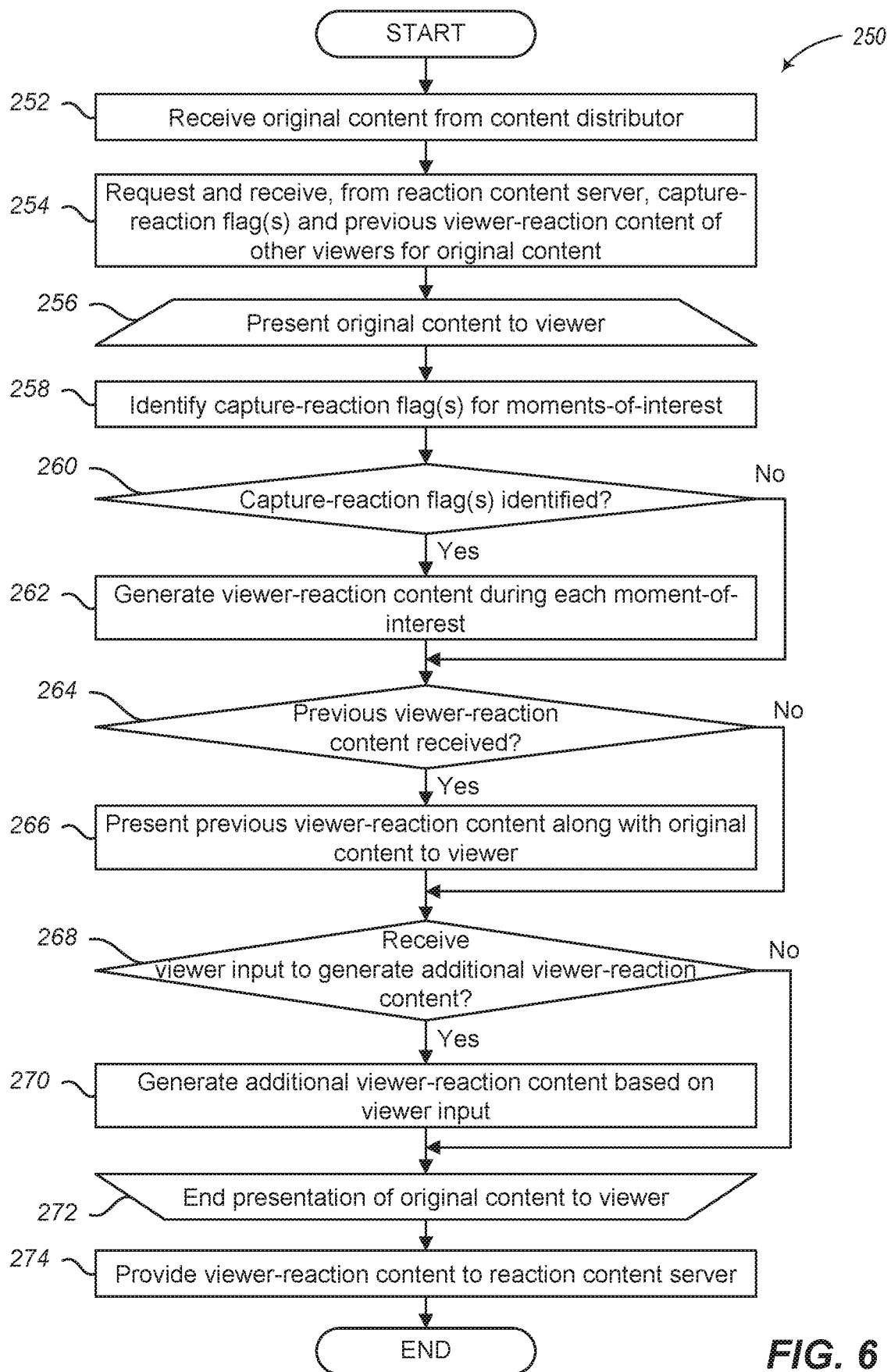
FIG. 6 is a logical flow diagram of another embodiment of an overview process by a viewer computer device for presenting content to a viewer and generating viewer-reaction content of the viewer in accordance with embodiments described herein.

FIG. 5 illustrates a logical flow diagram showing one embodiment of an overview process 200 by a reaction content server for receiving and providing viewer-reaction content to viewers in accordance with embodiments described herein. Process 200 begins, after a start block, at block 202, where original content is received from a content distributor. As mentioned above, the original content may be movies, television programs, news reports, viewer-generated content, or other types of audiovisual content.

Process 200 proceeds to block 204 where the original content is analyzed for one or more moments-of-interest. In various embodiments, block 204 employs embodiments described above in conjunction with block 154 in FIG. 3.

Process 200 continues at decision block 206, where a determination is made whether one or more moments-of-interest are identified in the original content. If a moment-of-interest is identified in the original content, then process 200 flows to block 208; otherwise, process 200 flows to block 210.

At block 208, a capture-reaction flag is stored for each moment-of-interest identified in the original content. The capture-reaction flag is used as a trigger to begin recording a viewer's reaction while the viewer is viewing the original content.

In various embodiments, a database is maintained to store an identifier of the original content (e.g., a title, year, and version) and one or more capture-reaction flags for one or more moments-of-interest identified in the original content. In some embodiments, each capture-reaction flag indicates a particular point in the original content to record a viewer's reaction. For example, the capture-reaction flag may be a timestamp indicating when a moment-of-interest occurs in the original content. The capture-reaction flag may also include a duration or end time indicating how long to capture the viewer's reaction associated with the moment-of-interest. In some embodiments, the capture-reaction flag may be modified to begin recording of the viewer's reactions prior to a moment-of-interest, which can be utilized to capture the viewer's reaction prior to and during the moment-of-interest.

In some embodiments, blocks 202, 204, 206, and 208 may be optional and may not be performed. For example, in some embodiments, a viewer may utilize one or more button clicks to initiate and record the viewer's reaction. A capture-reaction flag can then be generated based on the start and duration of the recorded viewer-reaction content when the viewer-reaction content is recorded or when it is provided to the reaction content server.

Continuing, after block 208, or if a moment-of-interest is not identified at decision block 206, process 200 proceeds to block 210. At block 210, the reaction content server receives an identification of the original content from a first viewer computer device. As described in more detail below, when a viewer requests original content from a content distributor, an identifier of the original content is also sent to the reaction content server to request information regarding viewer reactions from other viewers.

Process 200 continues next at block 212, where one or more capture-reaction flags are provided to the first viewer computer device. In various embodiments, the database storing original content identifiers and corresponding capture-reaction flags may be accessed using the original content identifier. The capture-reaction flags associated with the original content identifier are then selected and provided to the first viewer computer device, so that the first viewer computer device can record the viewer's reactions when viewing the original content provided by the content distributor. If there are no capture-reaction flags stored in the database for the original content, then a message may be provided to the first viewer computer device indicating that there are no previously stored capture-reaction flags, which allows the first viewer computer device to display a message to the viewer instructing the viewer to manually start and stop recordings of the viewer's reactions.

Process 200 continues at block 214, where first viewer-reaction content is received from the first viewer computer device. In various embodiments, block 214 may employ embodiments of block 162 to receive the first viewer-reaction content. In some embodiments, the first viewer-reaction content includes a timestamp, a reaction-presentation flag or the capture-reaction flag, or some other information indicating what part of the original content was being shown to the viewer when the first viewer-reaction content was recorded. In various embodiments, the first viewer-reaction content is stored in association with the original content and the corresponding capture-reaction flag.

Process 200 proceeds next to block 216, where an identification of the original content is received from a second viewer computer device. In various embodiments, block 216 employs embodiments of block 210 to receive information regarding the original content being requested by the second viewer computer device (rather than from the first viewer computer device).

Process 200 continues next to block 218, where the first viewer-reaction content is provided to the second viewer computer device. In various embodiments, the reaction content server provides the first viewer-reaction content to the second viewer computer device as a data stream that is separate and distinct from the original content data stream being provided to the second viewer computer device. In some embodiments, one or more reaction-presentation flags are also provided to the second viewer computer device.

Process 200 proceeds to block 220, where additional viewer-reaction content, such as second viewer-reaction content, is received from the second viewer computer device. In at least one embodiment, block 220 is optional and may not be performed, such as when the viewer of the second computer device does not record any viewer reactions. In other embodiments where block 220 is performed, block 220 employs embodiments of block 214 to receive the second viewer-reaction content.

Process 200 then terminates or otherwise returns to a calling process to perform other actions. In various embodiments, process 200 may perform other actions (not shown). For example, process 200 may determine whether to provide one or more of the stored viewer-reaction content to another viewer computer device, which may be similar to decision block 168. In at least one embodiment, process 200 can loop through blocks 216, 218, and 220 to provide capture-reaction flags and stored viewer-reaction content to another viewer computer device.

FIG. 6 is a logical flow diagram of another embodiment of an overview process 250 by a viewer computer device for presenting content to a viewer and generating viewer-reaction content of the viewer in accordance with embodiments described herein. Process 250 begins, after a start block, at block 252, where the viewer computer device receives the original content from the content distributor. In various embodiments, the viewer computer device requests the original content from the content distributor, such as via an application, internet browser, or other content-based interface.

Process 250 proceeds to block 254, where the viewer computer device sends a request for capture-reaction flags and previously stored viewer-reaction content to a reaction content server. In some embodiments, the request includes an identifier of the original content. In response, the viewer computer device receives one or more capture-reaction flags (if applicable) and one or more previous viewer-reaction content (if previously recorded and stored) for the original content. In some embodiments, each previous viewer-reaction content includes a reaction-presentation flag indicating where in the playback of the original content the previous viewer-reaction content is to be presented to the viewer.

As mentioned herein, each separate viewer-reaction content item may be received as a separate data stream. In some embodiments, however, multiple viewer-reaction content items may be received as a single data stream. Likewise, the previous viewer-reaction content may be a obtained from the reaction content server prior to playback of the original content or during playback, but before the time in the original content corresponding to the previous viewer-reaction content (similar to what is described above at block 176 in FIG. 4).

Process 250 proceeds to block 256, where the original content is presented to the viewer of the viewer computer device. In some embodiments, the original content is provided to a display device or a speaker to present the original content to the viewer. During presentation of the original content to the viewer, process 256 proceeds to block 258.

At block 258, the capture-reaction flags are analyzed to determine if a moment-of-interest is occurring in the original content. In some embodiments, this analysis occurs by reviewing a time associated with a capture-reaction flag and monitoring the playback time of the original content.

Process 250 continues at decision block 260, where a determination is made whether a capture-reaction flag is identified. If a capture-reaction flag is identified, then process 250 flows to block 262; otherwise, process 250 flows to decision block 264.

At block 262, viewer-reaction content is generated during each moment-of-interest associated with the identified capture-reaction flags. In various embodiments, block 262 employs embodiments of block 184 in FIG. 4 to generate the viewer-reaction content.

After block 262 or when no capture-reaction flags are identified at decision block 260, process 250 proceeds to decision block 264. At decision block 264, a determination is made whether previous viewer-reaction content is received from the reaction content server at block 254. In some embodiments, this determination is based on whether the viewer computer device receives a reaction-presentation flag or whether the viewer computer device receives additional data streams with the previous viewer-reaction content. If previous viewer-reaction content is received, process 250 flows to block 266; otherwise, process 250 flows to decision block 270.

At block 266, the previous viewer-reaction content is presented to the viewer along with the original content. In various embodiments, block 266 employs embodiments described in conjunction with block 188 in FIG. 4 to present the previous viewer-reaction to the viewer.

After block 266 or if previous viewer-reaction content is not received at decision block 264, process 250, proceeds to decision block 268. At decision block 268, a determination is made whether viewer input has been received to generate additional viewer-reaction content for the viewer of the viewer computer device. In various embodiments, decision block 268 employs embodiments described herein in conjunction with decision block 190 in FIG. 4. If viewer input is received to record the viewer's reaction and to generate the additional viewer-reaction content, then process 250 flows to block 270; otherwise, process 250 flows to block 272.

At block 270, additional viewer-reaction content is generated based on the viewer input. In various embodiments, block 270 employs embodiments described above in conjunction with block 192 in FIG. 4.

After block 270, process 250 continues to block 272, where the presentation of the original content to the viewer ends. Viewer-reaction content can be generated throughout the presentation of the original content to the viewer, such as by viewer input or in response to a capture-reaction flag in the original content. Similarly, previous viewer-reaction content can be presented to the viewer throughout the presentation of the original content to the viewer, such as based on a reaction-presentation flag in the original content. Accordingly, viewer-reaction content can be generated at the same time previous viewer-reaction content is being presented to the viewer.

Process 250 continues at block 274, where the viewer-reaction content generated at block 262 or block 270 is provided to the reaction content server. Similar to what is described above, the viewer computer device provides the viewer-reaction content and the corresponding timestamp in the original content to the viewer reaction server for distribution to other viewer computer devices.

After block 274, process 250 terminates or otherwise returns to a calling process to perform other actions.

Although FIG. 6 shows the viewer-reaction content as being provided to the reaction content server after the end of the presentation of the original content, embodiments are not so limited. In some embodiments, the viewer-reaction content is provided to the reaction content server as or after it is recorded but while the original content is still being presented to the viewer.

Figure 7:
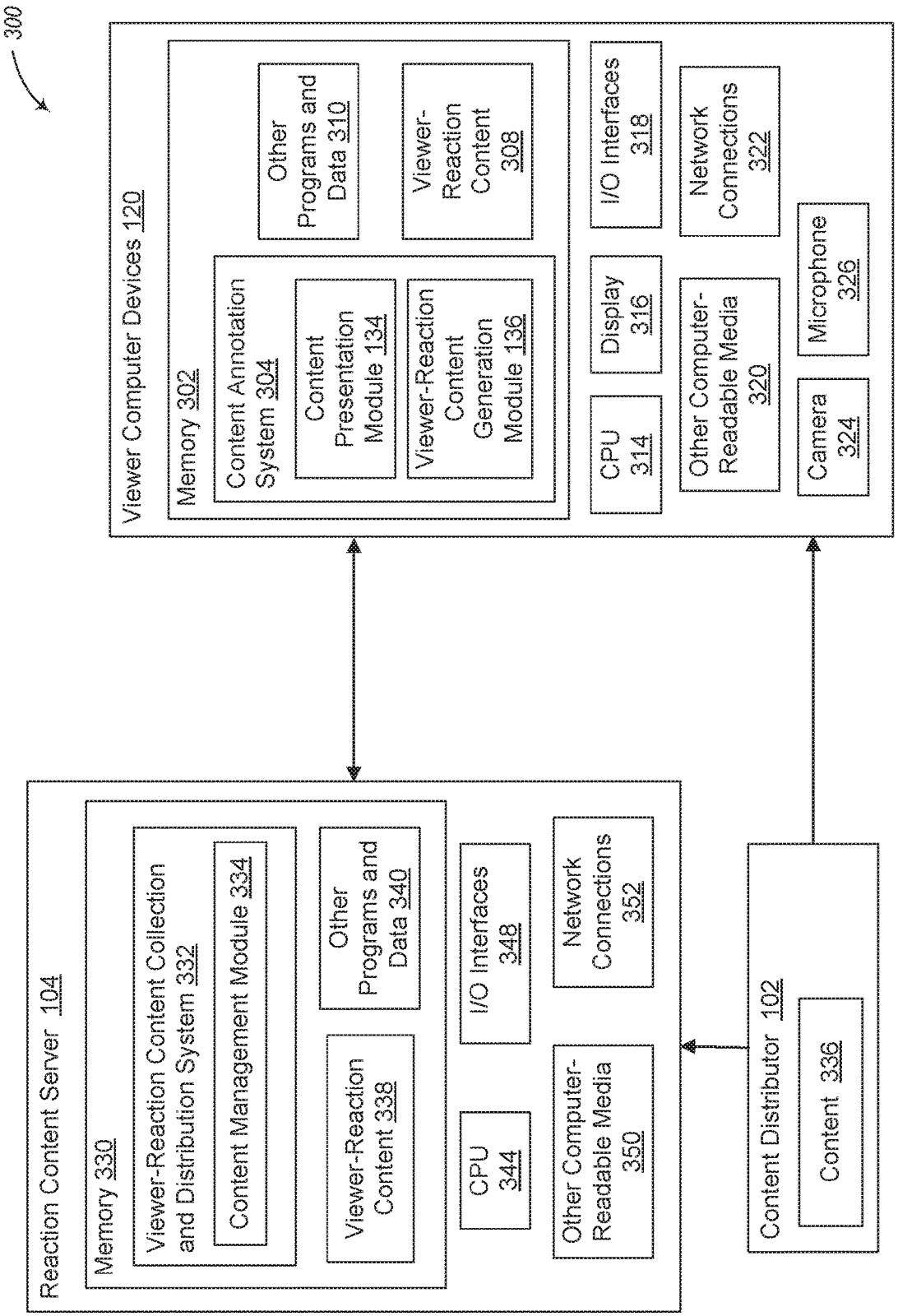
FIG. 7 is a system diagram that describes one implementation of computing systems for implementing embodiments described herein.

FIG. 7 shows a system diagram that describes one implementation of computing systems for implementing embodiments described herein. System 300 includes content distributor 102, reaction content server 104, and viewer computer devices 120.

Content distributor 102 provides original content to the viewer computer devices 120. Content distributor 102 includes or has access to content 336, which stores one or more items of audiovisual content to be presented to viewers of viewer computer devices 120. This audiovisual content may be referred to as the original content or the first content being presented to viewers. The content distributor includes other computing components that are not shown for ease of illustration. These computing components may include processors, memory, interfaces, network connections, etc. to perform at least some of the embodiments described herein, such as process 150 in FIG. 3.

Reaction content server 104 receives viewer-reaction content from the viewer computer devices 120 and provides the viewer-reaction content to other viewer-computer devices 120 to create a socially annotated version of the original content provided by the content distributor 102. In some embodiments, the reaction content server 104 analyzes original content for moments-of-interest and generates capture-reaction flags so that, while the original content is being presented to a viewer, viewer-reaction content of the viewer is generated during presentation of the moment-of-interest.

One or more special-purpose computing systems may be used to implement reaction content server 104. Accordingly, various embodiments described herein may be implemented in software, hardware, firmware, or in some combination thereof. In various embodiments, reaction content server 104 is also referred to as a server computer or server computing device.

Reaction content server 104 may include memory 330, one or more central processing units (CPUs) 344, I/O interfaces 348, other computer-readable media 350, and network connections 352.

Memory 330 may include one or more various types of non-volatile and/or volatile storage technologies. Examples of memory 330 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof.

Memory 330 is utilized to store information, including computer-readable instructions that are utilized by CPU 344 to perform actions and embodiments described herein. For example, memory 330 may have stored thereon viewer-reaction content collection and distribution system 332 and viewer-reaction content 338.

Viewer-reaction content 338 stores one or more items of audiovisual content generated by the viewer computer devices 120. Each viewer-reaction content includes a viewer's reaction—video, audio, or both—that corresponds to an original content item stored in content 336 by content distributor 102. Viewer-reaction content may also include the viewer's reactions to other viewer-reaction content for the same original content, when the other viewer-reaction content is presented to the viewer along with the original content. In some embodiments, the viewer-reaction content for a particular original content may be combined with the original content such that a single data stream including the original content and the corresponding viewer-reaction content can be provided to a viewer computer device 120. In other embodiments, the original content may be modified to include presentation-reaction flags (or capture-reaction flags), but the viewer-reaction content may remain separate until combined for display by the viewer computer device.

Viewer-reaction content collection and distribution system 332 includes content management module 334 to employ embodiments described herein. For example, the content management module 334 receives viewer-reaction content from viewer computer devices 120 and provides the viewer-reaction content to other viewer computer devices 120. In various embodiments, the content management module 334 interacts with the content distributor 102 to analyze the content 336 for moments-of-interest.

Memory 330 may also store other programs and data 340 to perform other actions associated with the operation of reaction content server 104.

Network connections 352 are configured to communicate with other computing devices, such as viewer computer devices 120, content distributor 102, or other devices not illustrated in this figure. In various embodiments, the network connections 352 include transmitters and receivers (not illustrated) to send and receive data as described herein. I/O interfaces 348 may include a keyboard, audio interfaces, video interfaces, or the like. Other computer-readable media 350 may include other types of stationary or removable computer-readable media, such as removable flash drives, external hard drives, or the like.

Viewer computer devices 120 receive content from content distributor 102 and viewer-reaction content of other viewers from reaction content server 104 for presentation to a viewer of the corresponding viewer computer device 120. The viewer computer devices 120 also generate viewer-reaction content of the viewer of that particular viewer computer device 120 and provide it to the reaction content server 104. One or more special-purpose computing systems may be used to implement each viewer computer device 120. Accordingly, various embodiments described herein may be implemented in software, hardware, firmware, or in some combination thereof.

Viewer computer devices 120 may include memory 302, one or more central processing units (CPUs) 314, display 316, I/O interfaces 318, other computer-readable media 320, network connections 322, camera 324, and microphone 326. Memory 302 may include one or more various types of non-volatile and/or volatile storage technologies, similar to what is described above for memory 330.

Memory 302 is utilized to store information, including computer readable instructions that are utilized by CPU 314 to perform actions and embodiments described herein. In some embodiments, memory 302 may have stored thereon content annotation system 304, which includes content presentation module 134 and viewer-reaction content generation module 136.

Content presentation module 134 receives original content from content distributor 102 and viewer-reaction content from reaction content server 104 and displays or otherwise presents the content to a viewer of viewer computer device 120, such as via display 316 or other I/O interfaces 318. In various embodiments, content presentation module 134 combines or otherwise overlays the viewer-reaction content onto the original content. In some embodiments, content presentation module 134 analyzes the original content to determine when to record the viewer's actions and notifies the viewer-reaction content generation module 136 to record the viewer's reaction.

Viewer-reaction content generation module 136 utilizes the camera 324 or the microphone 326, or both, to generate the viewer-reaction content by recording the viewer's reaction to the presentation of the original content or the other viewer-reaction content, or both. In some embodiments, viewer-reaction content generation module 126 receives instructions from content presentation module 134 to automatically record the record the viewer's reaction as specific timestamps or locations in the original content or to specific viewer-reaction content of other viewers. In other embodiments, the viewer of the viewer computer device 120 can interact with the viewer-reaction content generation module 136 via I/O interfaces 318 to provide input indicating when the viewer's reaction is to be recorded.

Memory 302 may also store viewer-reaction content 308, which temporarily stores the viewer-reaction content generated by viewer-reaction content generation module 136 prior to being provided to the reaction content server 104. Memory 302 may also store other programs and data 310 to perform other actions associated with the operation of viewer computer device 120.

Display 316 is configured to provide content to a display device for presentation of the content to a viewer. In some embodiments, display 316 includes the display device, such as a television, monitor, projector, or other display device. In other embodiments, display 316 is an interface that communicates with a display device.

I/O interfaces 318 may include a keyboard, audio interfaces (e.g., microphone 326), other video interfaces (e.g., camera 324), or the like. Network connections 322 are configured to communicate with other computing devices, such as content distributor 102 or other computing devices not illustrated in this figure. In various embodiments, the network connections 322 include transmitters and receivers (not illustrated) to send and receive data as described herein. Other computer-readable media 320 may include other types of stationary or removable computer-readable media, such as removable flash drives, external hard drives, or the like.

Although FIG. 7 illustrates the viewer computer device 120 as a single computing device, embodiments are not so limited. Rather, in some embodiments, a plurality of computing devices may be in communication with one another to provide the functionality of the viewer computer device 120, including embodiments described in FIGS. 1, 2, 4, and 6. Such computing devices may include smart phones, tablet computers, laptop computers, desktop computers, televisions, projectors, set-top-boxes, content receivers, other computing devices, or some combination thereof.

For example, a viewer's television may receive original content (e.g., from a content distributor or from a reaction content server) and present it to the viewer. A smart phone can then capture the viewer's reactions while the viewer is watching the original content on the television. The television or a set-top-box coordinating the display of the content on the television (collectively referred to as a television) and the smart phone can communicate with each other to determine where in the original content the viewer-reaction content was captured. In some embodiments, the television may provide the capture-reaction flags to the smart phone so that the smart phone can automatically start recording the viewer's reaction based on the capture-reaction flags. In other embodiments, the viewer can utilize one or more interfaces on the television or the smart phone to trigger the capture of a viewer reaction. The smart phone can provide the viewer-reaction content to the television for forwarding to the reaction content server, or the smart phone may provide the viewer-reaction content directly to the reaction content server.

In some embodiments, the television may also receive viewer-reaction content from the reaction content server for presentation to the viewer along with the original content. In other embodiments, the smart phone may obtain (via the television or from the reaction content server) the viewer-reaction content and present the viewer-reaction content on the smart phone to the viewer as the viewer is watching the original content on the television. In this way, the original content is not obstructed or changed by the viewer-reaction content.

Embodiments described herein may be further combined or modified to include additional functionality. The following paragraphs provide a brief discussion of such additional functionality—some of which are discussed in more detail elsewhere herein.

The viewer-reaction content may be stored on a remote server, such as reaction content server 104 or some other third-party content provider (including content distributor 102). The viewer-reaction content may be downloaded from content distributor 102 as the original content plays.

The viewer-reaction content may be manually recorded while the original content is playing. The viewer-reaction content may be automatically recorded while the original content is playing. The viewer-reaction content may be retrieved from a video buffer by user action after a recorded scene. The viewer-reaction content may be a text comment with optional image graphic, attachment or animation, and synced to a point on a timeline of the original content. The viewer-reaction content may also be an emoji or graphics reaction that the viewer chooses from a menu and is synced to a point on the timeline of the original content. The viewer-reaction content may be a sticker, where the viewer chooses a graphic from a menu and places is at a specific point on the screen, at a specific time during presentation of the original content to the viewer.

In some embodiments, the original content may be unmodified and timeline marks may be superimposed on the original content during presentation to a viewer based on information (e.g., reaction-presentation flags) received from the reaction content server 104. In other embodiments, the original content may be modified and marked along the original content timeline noting where viewer-reaction content takes place for one or a plurality of viewers. Timeline marks, where added to the original content or superimposed during display, may change size based on the length of viewer-reaction content or how many different viewer-reaction content occurs at that point in time. The viewer may select a timeline mark that jumps both the original content and the viewer-reaction content forward or back to that moment. Different colored or styled timeline marks may indicate a status of viewer-reaction content, such as saved, saving, unsaved, from-me, from-others etc. Viewer-reaction content may be pre-fetched and buffered several seconds ahead of time to make sure they play in-sync with the original content.

Viewer-reaction content may be presented by animating it into view, such as by fading in, pin wheeling in from one side of the screen, etc. The viewer-reaction content may itself be animated to indicate progress or time left in the viewer-reaction content (e.g., a circle border around the video clip fills in as it is presented to the viewer). Clicking or tapping on viewer-reaction content as it is presented may restart the viewer-reaction content at the beginning and rewinds the original content to the sync point. Presentation of viewer-reaction content may have an extra button for indicating that the viewer "likes" the viewer-reaction content, which can be aggregated with other "likes" to determine a priority of the viewer-reaction content. Clicking viewer-reaction content as it is presented may open additional options to perform on the viewer-reaction content, such as sharing or replying.

If presentation of two viewer-reaction content overlap on the timeline of the original content, the second clip may play on mute until the first clip finishes, it then unmutes. If the original content is paused, all currently visible viewer-reaction content may be paused. When presentation of the original content resumes, presentation of the viewer-reaction content may also resume. If the presentation of the original content pauses to buffer, presentation of any viewer-reaction content may also pause. The viewer-reaction content resumes when the original content resumes.

A camera viewfinder may provide a preview of the viewer's reactions and activates when the original content starts playing and is overlaid on top of the original content. The camera feed may be kept in a 10 second (or other timeframe) buffer to be used when the viewer activates the capture of the viewer-reaction content. The buffer may be cleared every 10 seconds (or other timeframe) and restarted. The previous buffer may be saved so there is always available buffer. If the viewer activates the viewer-reaction content and the current buffer is less than 4 seconds (or other timeframe), the previous buffer may be used with an offset mark. The viewer can activate the different types of viewer-reaction content by clicking on the viewfinder, such as 1-click, click-and-hold, double-click, etc. Additional camera settings may be utilized to enable the viewer to choose from available camera and audio devices as well as the aspect ratio, size and shape of the video clips for the viewer-reaction content. There may be additional buttons for activating text, emoji and sticker viewer-reaction content.

When new viewer-reaction content is created, a preview of the viewer-reaction content may be shown near the viewfinder. The preview may plays back immediately, on mute, and out-of-sync with the original content. Clicking the preview may cause the viewer-reaction content to restart, unmute and the original content to rewind to the sync point. When the preview finishes, a timer indicator counts down for 5 seconds (or other timeframe) after which the viewer-reaction content is saved to the server.

When new viewer-reaction content is created, an "unsaved" marker may be added to the timeline in the original content. The marker may change to "saved" when the viewer-reaction content is uploaded to the sever. Previews may have a "delete" button that erases the viewer-reaction content, removes its marker from the timeline and cancels the upload. When a preview is saved, it can be animated to the section of the screen where standard viewer-reaction content is displayed. Newly saved viewer-reaction content may become instantly available to other viewers watching the same original content.

Viewers can indicate that the original content should pause when previous viewer-reaction content is presented. When the previous viewer-reaction content ends, the original content resumes. The volume of the original content playing may be automatically lowered when the previous viewer-reaction content is presented to the viewer and is restored when the previous viewer-reaction content finishes. Facial recognition may be used to zoom in on faces and frame faces in video Viewer-reaction content. Analysis of captured video or audio may be used to trigger creation or generation of viewer-reaction content.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a computer that includes a first memory that stores first computer instructions and a first processor that when executing the first computer instructions performs actions, the actions including:
receiving first audiovisual content;
analyzing the first audiovisual content to identify a moment-of-interest;
in response to identifying the moment-of-interest, generating a capture-reaction flag indicating a start of the moment-of-interest;
receiving, from the first viewer computing device, information identifying the first audiovisual content;
in response to receiving the information identifying the first audiovisual content, providing the capture-reaction flag to the first viewer computer device to capture a reaction of a first viewer of the first viewer computer device;
receiving, from the first viewer computer device, a second audiovisual content of the reaction of the first viewer captured during presentation of the moment-of-interest associated with the capture-reaction flag to the first viewer; and
providing the second audiovisual content to a second viewer computer device to present a combination of the second audiovisual content along with the first audiovisual content to a second viewer of the second viewer computer device.

2. The system of claim 1, further comprising:
the first viewer computer device that includes a microphone, a camera, a second memory that stores second computer instructions, and a second processor that when executing the second computer instructions performs actions, the actions including:
receiving the first audiovisual content from a content distributor;
providing the information identifying the first audiovisual content to the server computer;
presenting the first audiovisual content to the first viewer;
during the presentation of the first audiovisual content to the first viewer:
identifying the capture-reaction flag received from the server computer; and
in response to identifying the capture-reaction flag, utilizing the microphone and the camera to generate the second audiovisual content of the first viewer during the moment-of-interest; and
providing the second audiovisual content to the server computer.

3. The system of claim 2, wherein the second processor when executing the second computer instructions performs further actions, the further actions including:
utilizing the microphone and the camera to generate third audiovisual content of the first viewer during presentation of the first audiovisual content to the first viewer;
continuously buffering a predetermined amount of the third audiovisual content;
in response to receiving an input from the first viewer to record the third audiovisual content, identifying the currently buffered third audiovisual content;
determining a timestamp of the first audiovisual content associated with a beginning of the currently buffered third audiovisual content;
associating a beginning of the third audiovisual content with the timestamp; and
providing the third audiovisual content and the timestamp to the server computer.

4. The system of claim 2, wherein the second processor when executing the second computer instructions performs further actions, the further actions including:
in response to receiving an input from the first viewer to record third audiovisual content, utilizing the microphone and the camera to generate the third audiovisual content of the first viewer;
determining a timestamp associated with the first audiovisual content when the input was received;
associating a beginning of the third audiovisual content with the timestamp; and
providing the third audiovisual content and the timestamp to the server computer.

5. The system of claim 2, wherein the second processor when executing the second computer instructions performs further actions, the further actions including:
in response to receiving an input from the first viewer to record third audiovisual content, pausing the presentation of the first audiovisual content to the first computer and utilizing the microphone and the camera to generate the third audiovisual content of the first viewer;
determining a timestamp associated with the first audiovisual content when the input was received;
associating a beginning of the third audiovisual content with the timestamp;
restarting presentation of the first audiovisual content to the first viewer; and
providing the third audiovisual content and the timestamp to the server computer.

6. The system of claim 2, wherein the second processor when executing the second computer instructions performs further actions, the further actions including:
in response to generating the second audiovisual content:
pausing the presentation of the first audiovisual content to the first viewer;
overlaying the second audiovisual content on the first audiovisual based on the capture-reaction flag; and
re-presenting the first audiovisual content with the overlaid second audiovisual content starting at the capture-reaction flag.

7. The system of claim 2, wherein the second processor when executing the second computer instructions performs further actions, the further actions including:
in response to generating the second audiovisual content:
overlaying the second audiovisual content on the first audiovisual content; and
continuing presentation of the first audiovisual content with the overlaid second audiovisual content, wherein the second audiovisual content is presented in a muted state.

8. The system of claim 2, wherein the second processor when executing the second computer instructions performs further actions, the further actions including:
in response to generating the second audiovisual content and prior to providing the second audiovisual content to the computer, presenting a preview of the second audiovisual content to the first viewer;
in response to receiving an input from the first viewer to save the second audiovisual content, maintaining the second audiovisual content; and
in response to not receiving the input from the first viewer to save the second audiovisual content, discarding the second audiovisual content.

9. The system of claim 1, wherein the second viewer computer device includes a third memory that stores third computer instructions and a third processor that when executing the third computer instructions performs actions, the actions including:
    receiving the first audiovisual content from a content distributor;
    receiving the second audiovisual content and the capture-reaction flag from the server computer;
    presenting the first audiovisual content to the second viewer; and
    during the presentation of the first audiovisual content to the second viewer:
        identifying the capture-reaction flag;
        in response to identifying the capture-reaction flag, presenting the second audiovisual content to the second viewer during the moment-of-interest in the first audiovisual content; and
        resuming presentation of the first audiovisual content without the second audiovisual content after the moment-of-interest.

10. The system of claim 9, wherein presenting the second audiovisual content to the second viewer includes:
    combining the second audiovisual content of the first viewer with the first audiovisual content; and
    presenting the combined first audiovisual content and the second audiovisual content to the second viewer during the moment-of-interest in the first audiovisual content.

11. The system of claim 9, wherein presenting the second audiovisual content to the second viewer includes:
    pausing the presenting of the first audiovisual content to the second viewer;
    presenting the second audiovisual content to the second viewer; and
    in response to completion of presenting the second audiovisual content to the second viewer, resuming presentation of the first audiovisual content to the second viewer.

12. The system of claim 9, wherein the third processor when executing the third computer instructions performs further actions, the further actions including:
    receiving, from the server computer, third audiovisual content of a third viewer, wherein the third audiovisual content is associated with the capture-reaction flag; and
    in response to the identifying of the capture-reaction flag, presenting the third audiovisual content to the second viewer.

13. The system of claim 12, wherein the presenting of the second and third audiovisual content to the second viewer further includes:
    determining a first priority of the of the first viewer and a second priority of the third viewer; and
    in response to a determination that the third viewer has a higher priority than the first viewer, presenting the third audiovisual content in an unmuted state and presenting the second audiovisual content in a muted state.

14. The system of claim 13 wherein the first priority of the first viewer and a second priority of the third viewer are determined based on at least one of:
    a viewer profile of the second viewer;
    a first viewer rating of the first viewer and a second viewer rating of the third viewer;
    a first number of followers of the first viewer and a second number of followers of the third viewer; or
    first demographics of the first viewer and second demographics of the third viewer relative to third demographics of the second user.

15. The system of claim 13, wherein the third processor when executing the third computer instructions performs further actions, the further actions including:
    during the presentation of the second and third audiovisual content, receiving an input from the second viewer to unmute the second audiovisual content; and
    in response to receiving the input from the second viewer, presenting the second audiovisual content in an unmuted state and presenting the third audiovisual content in a muted state.

16. The system of claim 13, wherein the third processor when executing the third computer instructions performs further actions, the further actions including:
    during the presentation of the second and third audiovisual content and in response to the third audiovisual content ending prior to the second audiovisual content, presenting a remainder of the second audiovisual content in an unmuted state.

17. A system, comprising:
    a computer that includes a first memory that stores first computer instructions and a first processor that when executing the first computer instructions performs actions, the actions including:
        receiving a first data stream that includes first audiovisual content;
        analyzing the first audiovisual content to identify a moment-of-interest;
        in response to identifying the moment-of-interest, modifying the first data stream to include a capture-reaction flag indicating a start of the moment-of-interest;
        providing the modified first data stream to a first viewer computer device to present the first audiovisual content to a first viewer of the first viewer computer device;
        receiving, from the first viewer computer device, a second data stream that includes second audiovisual content of the first viewer generated during presentation of the moment-of-interest to the first viewer; and
        providing the modified first data stream and the second data stream to a second viewer computer device to present a combination of the first audiovisual content and the second audiovisual content to a second viewer of the second viewer computer device based on the capture-reaction flag.

18. The system of claim 17, wherein the first viewer computer device includes a microphone, a camera, a second memory that stores second computer instructions, and a second processor that when executing the second computer instructions performs actions, the actions including:
    receiving the modified first data stream from the server computer;
    presenting the first audiovisual content from the modified first data stream to the first viewer;
    during the presentation of the first audiovisual content to the first viewer:
        analyzing the modified first data stream to identify the capture-reaction flag; and
        in response to identifying the capture-reaction flag, utilizing the microphone and the camera to generate the second audiovisual content of the first viewer during the moment-of-interest;
    generating the second data stream to include the second audiovisual content; and
    providing the second data stream to the server computer.

19. The system of claim 18, wherein the second processor when executing the second computer instructions performs further actions, the further actions including:
   utilizing the microphone and the camera to generate third audiovisual content of the first viewer during presentation of the first audiovisual content to the first viewer;
   continuously buffering a predetermined amount of the third audiovisual content;
   in response to receiving an input from the first viewer to record the third audiovisual content, generating a third data stream with the currently buffered third audiovisual content;
   determining a timestamp of the first audiovisual content associated with a beginning of the currently buffered third audiovisual content;
   associating a beginning of the third data stream with the timestamp; and
   providing the third data stream and the timestamp to the server computer to provide to the second viewer computer device along with the modified first data stream for combined presentation based on the timestamp.

20. The system of claim 18, wherein the second processor when executing the second computer instructions performs further actions, the further actions including:
   in response to receiving an input from the first viewer to record third audiovisual content, utilizing the microphone and the camera to generate the third audiovisual content of the first viewer;
   determining a timestamp associated with the first audiovisual content when the input was received;
   generating a third data stream with the third audiovisual content and associating a beginning of the third data stream with the timestamp; and
   providing the third data stream and the timestamp to the server computer to provide to the second viewer computer device along with the modified first data stream for combined presentation based on the timestamp.

21. The system of claim 18, wherein the second processor when executing the second computer instructions performs further actions, the further actions including:
   in response to receiving an input from the first viewer to record third audiovisual content, pausing the presentation of the first audiovisual content to the first computer and utilizing the microphone and the camera to generate the third audiovisual content of the first viewer;
   determining a timestamp associated with the first audiovisual content when the input was received;
   generating a third data stream with the third audiovisual content and associating a beginning of the third data stream with the timestamp;
   restarting presentation of the first audiovisual content to the first viewer; and
   providing the third data stream and the timestamp to the server computer to provide to the second viewer computer device along with the modified first data stream for combined presentation based on the timestamp.

22. The system of claim 18, wherein the second processor when executing the second computer instructions performs further actions, the further actions including:
   in response to generating the second audiovisual content:
      pausing the presentation of the first audiovisual content to the first viewer;
      overlaying the second audiovisual content on the first audiovisual based on the capture-reaction flag; and
      re-presenting the first audiovisual content with the overlaid second audiovisual content starting at the capture-reaction flag.

23. The system of claim 18, wherein the second processor when executing the second computer instructions performs further actions, the further actions including:
   in response to generating the second audiovisual content:
      overlaying the second audiovisual content on the first audiovisual content; and
      continuing presentation of the first audiovisual content with the overlaid second audiovisual content, wherein the second audiovisual content is presented in a muted state.

24. The system of claim 18, wherein the second processor when executing the second computer instructions performs further actions, the further actions including:
   in response to generating the second audiovisual content and prior to generating the second data stream, presenting a preview of the second audiovisual content to the first viewer;
   in response to receiving an input from the first viewer to save the second audiovisual content, generating the second data stream to include the second audiovisual content; and
   in response to not receiving the input from the first viewer to save the second audiovisual content, discarding the second audiovisual content.

25. The system of claim 17, wherein the second viewer computer device includes a third memory that stores third computer instructions and a third processor that when executing the third computer instructions performs actions, the actions including:
   receiving the modified first data stream from the server computer;
   presenting the first audiovisual content from the modified first data stream to the second viewer; and
   during the presentation of the first audiovisual content to the second viewer:
      analyzing the modified first data stream to identify the capture-reaction flag;
      in response to identifying the capture-reaction flag, presenting the second audiovisual content to the second viewer during the moment-of-interest in the first audiovisual content; and
      resuming presentation of the first audiovisual content without the second audiovisual content after the moment-of-interest.

26. The system of claim 25, wherein presenting the second audiovisual content to the second viewer includes:
   combining the second audiovisual content of the first viewer from the second data stream with the first audiovisual content; and
   presenting the combined first audiovisual content and the second audiovisual content to the second viewer during the moment-of-interest in the first audiovisual content.

27. The system of claim 25, wherein presenting the second audiovisual content to the second viewer includes:
   pausing the presenting of the first audiovisual content to the second viewer;
   presenting the second audiovisual content to the second viewer; and
   in response to completion of presenting the second audiovisual content to the second viewer, resuming presentation of the first audiovisual content to the second viewer.

28. The system of claim 25, wherein the third processor when executing the third computer instructions performs further actions, the further actions including:

receiving, from the server computer, a third data stream that is associated with the capture-reaction flag and that includes third audiovisual content of a third viewer; and in response to the identifying of the capture-reaction flag, presenting the third audiovisual content to the second viewer.

29. The system of claim 28, wherein the presenting of the second and third audiovisual content to the second viewer further includes:

determining a first priority of the of the first viewer and a second priority of the third viewer; and in response to a determination that the third viewer has a higher priority than the first viewer, presenting the third audiovisual content in an unmuted state and presenting the second audiovisual content in a muted state.

30. The system of claim 29 wherein the first priority of the first viewer and a second priority of the third viewer are determined based on at least one of:

a viewer profile of the second viewer;

a first viewer rating of the first viewer and a second viewer rating of the third viewer;

a first number of followers of the first viewer and a second number of followers of the third viewer; or first demographics of the first viewer and second demographics of the third viewer relative to third demographics of the second user.

31. The system of claim 29, wherein the third processor when executing the third computer instructions performs further actions, the further actions including:

during the presentation of the second and third audiovisual content, receiving an input from the second viewer to unmute the second audiovisual content; and in response to receiving the input from the second viewer, presenting the second audiovisual content in an unmuted state and presenting the third audiovisual content in a muted state.

32. The system of claim 29, wherein the third processor when executing the third computer instructions performs further actions, the further actions including:

during the presentation of the second and third audiovisual content and in response to the third audiovisual content ending prior to the second audiovisual content, presenting a remainder of the second audiovisual content in an unmuted state.

33. A method, comprising:

analyzing first audiovisual content to identify a moment-of-interest;

in response to identifying a moment-of-interest, modifying the first audiovisual content to include a capture-reaction flag indicating a start of the moment-of-interest and a time during presentation of the first audiovisual content to generate second audiovisual content of a first viewer;

presenting the first audiovisual content to the first viewer;

during the presentation of the first audiovisual content to the first viewer:

detecting the capture-reaction flag in the first audiovisual content; and in response to the detection of the capture-reaction flag:

generating second audiovisual content of the first viewer; and associating a beginning of the second audiovisual content with a timestamp;

presenting the first audiovisual content to a second viewer; and during the presentation of the first audiovisual content to the second viewer:

analyzing the first audiovisual content to identify the timestamp; and in response to identifying the timestamp, presenting the second audiovisual content to the second viewer.

34. The method of claim 33, further comprising:

during the presentation of the first audiovisual content to the second viewer:

receiving third audiovisual content to present to the second viewer;

determining that a presentation of the third audiovisual content to the second viewer at least partially overlaps the presentation of the second audiovisual content to the second viewer;

determining that one of the third audiovisual content and the second audiovisual content has a higher priority and one has a lower priority; and presenting the higher priority audiovisual content to the second viewer in an unmuted state and presenting the lower priority audiovisual content to the second viewer in a muted state.

35. The method of claim 34, further comprising:

determining that the presentation of the third audiovisual content to the second viewer has ended prior to an end of the presentation of the second audiovisual content to the second viewer; and presenting a remainder of the second audiovisual content to the second viewer in an unmuted state.

36. The method of claim 34, further comprising:

in response to generating the second audiovisual content of the first viewer, presenting the second audiovisual content to the first viewer in a muted state while the presentation of the first audiovisual content to the first viewer continues.

37. The method of claim 34, further comprising:

in response to generating the second audiovisual content of the first viewer, rewinding the presentation of the first audiovisual content to the first viewer based on the timestamp; and synchronously presenting the second audiovisual content along with the first audiovisual content to the first viewer.

38. A non-transitory computer-readable medium having stored contents that, when executed by a processor of a computing system, cause the computing system to:

receive first audiovisual content from a server computer;

analyze first audiovisual content to identify a moment-of-interest;

in response to identifying a moment-of-interest, modify the first audiovisual content to include a capture-reaction flag indicating a start of the moment-of-interest;

present the first audiovisual content a first viewer; and during the presentation of the first audiovisual content to the first viewer:

identify the capture-reaction flag to initiate generation of second audiovisual content of the first viewer;

in response to identifying the capture-reaction flag, utilize a microphone and a camera to generate the second audiovisual content of the first viewer without input from the first viewer;

provide the second audiovisual content to the server computer to be provided to other computing systems;

analyze the first audiovisual content to identify a reaction-presentation flag to initiate presentation of third audiovisual content to the first viewer, the third audiovisual content being generated during presentation of the first audiovisual content to a second viewer;

in response to identifying the reaction-presentation flag, request the third audiovisual content from the server computer; and in response to receiving the third audiovisual content, present the third audiovisual content to the first viewer in synchronization with the first audiovisual content.

39. A method, comprising:

receiving, from a first viewer computing device, information identifying first audiovisual content;

in response to receiving the information identifying the first audiovisual content, providing a capture-reaction flag to the first viewer computer device to capture a reaction of a first viewer of the first viewer computer device;

receiving, from the first viewer computer device, a second audiovisual content of the reaction of the first viewer captured during presentation of the moment-of-interest associated with the capture-reaction flag to the first viewer; and providing the second audiovisual content to a second viewer computer device to present a combination of the second audiovisual content along with the first audiovisual content to a second viewer of the second viewer computer device.

* * * * *